United States Patent [19]

Thiel et al.

[11] 4,039,609
[45] Aug. 2, 1977

[54] METHOD FOR THE MANUFACTURE OF THIN-WALLED SHAPED ARTICLES OF THERMOPLASTIC MATERIAL

[75] Inventors: Alfons W. Thiel, Mainz; Hans Hell, Wiesbaden, both of Germany

[73] Assignee: Bellaplast GmbH, Wiesbaden, Germany

[21] Appl. No.: 717,221

[22] Filed: Aug. 24, 1976

Related U.S. Application Data

[63] Continuation-in-part of Ser. No. 408,083, Oct. 19, 1973, abandoned.

[30] Foreign Application Priority Data

| Oct. 25, 1972 | Germany | 2252219 |
| Dec. 19, 1972 | Germany | 2262093 |
| June 4, 1973 | Germany | 2328368 |
| Sept. 6, 1973 | Germany | 2344866 |

[51] Int. Cl.² .............................................. B29D 7/04
[52] U.S. Cl. ................................ 264/210 R; 264/171; 264/295
[58] Field of Search ................ 264/98, 171, 210 R, 264/295

[56] References Cited

U.S. PATENT DOCUMENTS

| 3,159,698 | 12/1964 | Suh | 264/210 R |
| 3,363,034 | 1/1968 | Noland | 264/98 X |
| 3,448,183 | 6/1969 | Chisholm | 264/171 X |
| 3,454,693 | 7/1969 | Crenshaw | 264/210 X |
| 3,677,537 | 7/1972 | Winstead | 264/210 R |
| 3,886,250 | 5/1975 | Danko | 264/210 R |
| 3,931,383 | 1/1976 | Erlewine | 264/210 R |
| 3,980,744 | 9/1976 | Cogswell | 264/98 X |

*Primary Examiner*—Richard R. Kucia
*Attorney, Agent, or Firm*—Strauch, Nolan, Neale, Nies, Kurz

[57] ABSTRACT

Thin-walled articles of thermoplastic material are formed in a continuous method and apparatus starting with heating and extruding granular thermoplastic raw material in the form of a continuous web which is immediately stabilized by rapid cooling of its opposite surfaces and the stabilized web wherein the material sandwiched between the precooled outer surface layers remains at or near extrusion temperature is fed into a thermal forming station wherein shaping tools form the articles in the web without the need for further heating of the web. Adjustments are provided for correlating the cooling action to different materials and web feed rates, for varying the web feed rates and increments, and for varying the shaping tool movements to adapt for different materials and sizes of articles. After the formed articles are separated from the web the web residue is fed back to be mixed with incoming raw material at the extrusion station.

29 Claims, 31 Drawing Figures

Fig. 3
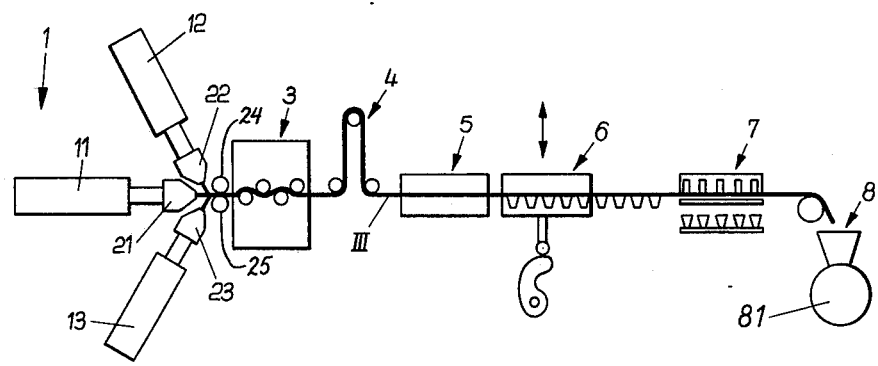
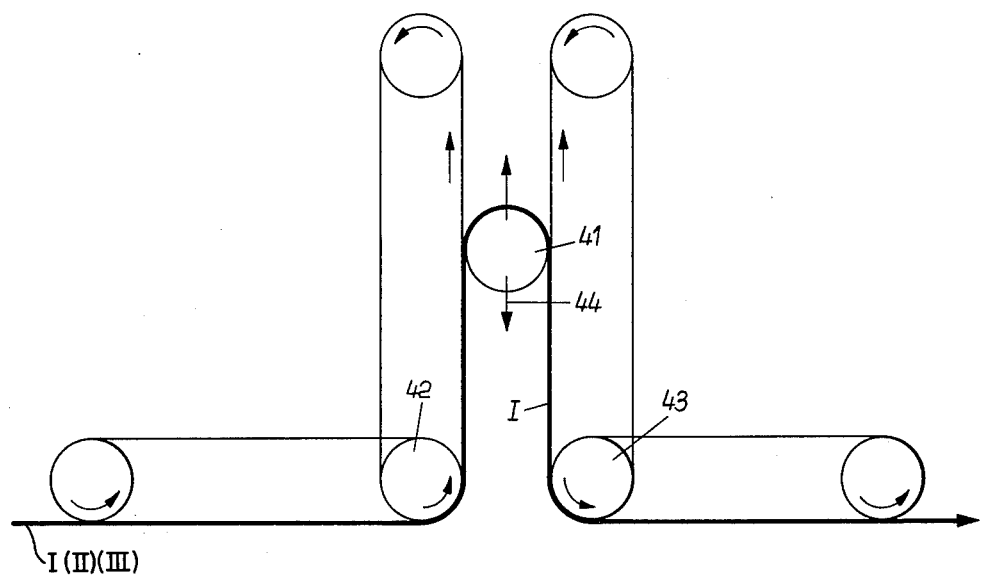
Fig. 8

METHOD FOR THE MANUFACTURE OF THIN-WALLED SHAPED ARTICLES OF THERMOPLASTIC MATERIAL

This is a continuation-in-part of abandoned copending application Ser. No. 408,083 filed Oct. 19, 1973 for Method and Apparatus for Forming Thin-Walled Articles From Thermoplastic Material.

This invention relates to the manufacture of thin-walled articles such as cups, plates and like containers of synthetic thermoplastic material, and particularly to special method steps and apparatus for making the articles.

In its preferred embodiments the invention will be disclosed as incorporated in an in-line thermal forming method and apparatus, wherein a thermoplastic material, preferably of the granular kind, is plasticized by heating and compression and cast into a plastic web as from a fish-tail nozzle, or cast into several plastic webs from different fish-tail nozzles, the several plastic webs being superposed and united immediately into a composite web. The web is rapidly cooled at its opposite exposed surfaces in a stabilizing station so that a sandwich-like condition is obtained, wherein the two surface layers of the web will become more solidified and supportive while the core or internal layer or layers will remain highly plastic and paste-like or fluid. Despite stabilization and cooling, the outer layers remain warm and soft enough to be deformed by die or other tool action. The stabilized web is subsequently subjected to a thermal forming process wherein the outer layers of the web are deformed to shapes corresponding to die contours while the still hot fluid internal plastic material is distributed between the shaped outer layers.

BACKGROUND OF THE INVENTION

In most known thermal forming methods (see U.S. Pat. No. 3,115,677), a previously manufactured and completely cooled and stored thermoplastic web is heated, usually by infra-red radiation, prior to the thermal shaping on one or both surfaces, to a forming temperature. Thermoplastic materials being poor heat conductors however, the web must be raised to very high and usually uncontrollable temperatures at the surface or surfaces in order to supply sufficient heat to raise the web core to the desired temperature. If relatively thick webs, for example webs exceeding 1 mm in thicknesses, are to be formed to articles, considerable time is required for heating the web through the surfaces. Furthermore, considerable damage may be caused at the web surfaces, whether thick or thin webs, because of excessively high temperatures and especially because of possible oxidation at those high temperatures, so that thermoplastic articles so made may be degraded at least at the outer surfaces.

In-line thermal forming methods are known (German Auslegeschrift No. 1,165,241; U.S. Pat. No. 2,891,980), wherein a thin thermoplastic web is continuously cast from an extruder followed by a fish-tail nozzle and is fed to a device converting the continuous advance into a stepwise advance, whence the web will be brought to negative (female) dies in a thermal shaping machine. In these known methods, the web is set for temperatures as low as possible during casting from the nozzle so that it may be immediately fed to the advance converter. The heat supplied to the web during extrusion is kept so low that it usually will not suffice or be retained for the ensuing thermal forming, and so additional heaters acting on the web surface are provided which may result in the above described drawbacks with respect to web surface.

Another example of prior art methods and apparatus involving successive web forming and thermal shaping is disclosed in U.S. Pat. No. 2,697,328.

OBJECTS AND ADVANTAGES OF THE INVENTION

It is a major object of the invention to provide novel methods and apparatus for manufacturing articles from thermoplastic material wherein an extruded hot plastic web is immediately stabilized by being cooled along its opposite surfaces to provide along those surfaces shell or supportive outer layers that are warm and soft enough to be deformable by subsequent shaping die action while the thermoplastic material internally of those layers remains sufficiently hot to retain plasticity and be capable of redistribution between the outer layers during die action.

Another object of the invention is to provide novel methods and apparatus for the manufacture of articles from thermoplastic material, wherein the material is compressed and heated in an extruder to liquefaction and is cast into a hot plastic web (or several hot plastic web components may be cast and superposed to form a composite web) and the web immediately upon leaving the extruder nozzle or nozzles will be stabilized while still in the hot plastic state by being so cooled at both surfaces that the thermoplastic material at those surfaces will form supportive layers that are deformable even though stable, while the material interiorly of those layers essentially remains at the extrusion temperature and in the fluid or plastic state, and then subjecting the web so stabilized to a thermal forming operation.

A further object of the invention is to provide novel apparatus for controllably cooling the opposed surfaces of a freshly formed hot plastic web. Pursuant to this object adjustment may be provided for selectively regulating the degree of cooling.

Another object of the invention is to provide in the foregoing novel methods and apparatus providing an additional sequence between surface cooling of the web and shaping the web, whereby the temperature at the web surfaces is made uniform over section of the web to be subjected to shaping in a subsequent operation. Pursuant to this object novel apparatus is contemplated wherein the surface temperature distribution over the web section may be accomplished by reflectors proportionately reflecting heat radiated from the hot plastic web, and/or heated air circulation systems effective at the web surfaces.

A further object of the invention is to form a composite web from thermoplastic materials, where the material layer or layers at one or both surfaces of the web may be of different properties than at the core. For example, the web may be butadiene-rubber modified polystyrene at the surface or surfaces, that is, impact-proof polystyrene, while being standard polystyrene at the core.

Another object of the invention is to form a composite web from thermoplastic materials, the material at the surface or surfaces being a polyolefin, for example polypropylene or polyethylene, while the material at the core will be a polystyrene reacted with butadiene-rubber. An appreciably more marked surface sheen may be achieved in this manner, with improved relief shaping and considerably increased water vapor sealing in the formed articles.

A further object of the invention is to form a composite web from thermoplastic materials, the material being a polycarbonate at the surfaces and a standard polystyrene, or one modified with an impact-proof buradiene-rubber, at the core. Formed articles may be economically made in such manner that will remain rigid, temperature-resistant and glossy to a temperature range of 130°–135° C.

Another object of the invention is to make a composite web from thermoplastic materials the outer layers of which are a standard polystyrene or polystyrene modified with butadiene-rubber, and of a shaping temperature in the range of 130°–140° C, and the material of the web core being a poly-alpha-methyl-styrene with a shaping temperature in the range of 170°–180° C. The external layers of polystyrene of this web may be cooled down to the lower range of the shaping temperature. Besides good deep-draw ductility for the above described web, the articles formed therefrom are of better mechanical quality than could be previously achieved.

It is a further main object of the invention to provide apparatus for the manufacture of thin-walled thermoplastically shaped articles comprising in sequence an extrusion device suited to receive granular thermoplastic material and to continuously compress and heat same until liquefaction and a web-spraying mold as in the form of a fish-tail nozzle connected to the extrusion device and provided with temperature regulators, a stabilizing and cooling device directly receiving the web from the nozzle and having cooling elements contacting directly both sides of the web and conducting heat away and preferably connected to regulators adjusting the applied cooling temperature, a thermal forming device to shape articles from the web by deep-drawing or stamping and devices for cutting the articles from the web. By means of this equipment, molded articles may be line-produced, preferably from granular synthetics, this equipment being marked by reliable, rapid operation because the hot plastic web will be immediately stabilized in the cooling device to an extent sufficient for further processing without losing appreciable amounts of the heat stored in it, so that the stored heat of extrusion suffices entirely or the thermal forming process and no auxiliary or extra heating equipment may be needed.

It is further an object of the invention to provide for the foregoing apparatus above novel apparatus components for converting continuous advance of the stabilized web into intermittent advance toward the thermal forming device.

Another object of the invention is to provide in the foregoing apparatus a dwell station where the recently formed and stabilized web will be set for desired uniform surface temperatures prior to the thermal forming operation. Specific to this object a tempering device at the dwell station may be provided which will set the desired surface temperature only at definite web surface areas, for example the forming areas or the boundaries.

It is a further object of the invention to provide for the foregoing apparatus a radiation-temperature measuring instrument at the dwell station and automatic control for the stabilizing and cooling device and for the extrusion and thermal shaping device, this automatic control being independent of the desired forming temperature when controlling the temperature, and consisting in:

a. changing the length of the heat exchange contact between web surfaces and cooling elements of the stabilizing and cooling device, for instance by altering the looping angle of the web around one or more cooling rollers;

b. changing temperature in the cooling medium in the stabilizing and cooling device; and c. changing the frequency of operation of the thermal forming device.

If one wishes avoiding altering the weights of the manufactured articles on account of changes in the frequency of operation of the thermal shaping device, one must simultaneously undertake an alteration in the output of the extrusion device and the web-spraying mold. The foregoing controls should be automatically introduced in the sequence by means of the regulation device if each preceding measure no longer should suffice.

Another object of the invention is to provide in apparatus of the foregoing type, a thermal forming arrangement comprising apparatus for pressing one web surface against a shaped die surface by applying a fluid pressure to the other web surface.

A further object of the invention is to provide compact apparatus for the manufacture of thin-walled, thermoplastically shaped articles, comprising:

devices for feeding and moving hot thermoplastic webs;

devices for surface tempering the webs to a temperature suitable for thermal forming;

a thermal forming device for making shaped articles from the web by deep-drawing or stamping;

at least one vertically movable die support for the thermal shaping device;

and synchronously related drives for the thermal forming device and for the devices for feeding and moving the webs, wherein related cams control vertical movement of the die support and the advance motions for the webs; and the drives are equipped with adjusting devices to regulate the vertical motions of the die supports to correspond to the size of the articles to be manufactured and to trim the web motions to the required length and characteristics for each operational sequence as:

devices for stamping the shaped articles from the web;

devices for removing the formed articles, and devices for removing the web residues.

Further objects of the invention comprise in the foregoing apparatus novel detail such as shock absorbing and damping mechanism at the thermal forming station, and novel motor driven cam and belt drive arrangements for controlling operation of the various stations in the apparatus in desired synchronism, usually adjustable.

A further important object of the invention consists in creating a process and apparatus of the above indicated kind, wherein the web at the shaping temperature will be precooled prior to thermal shaping outside the areas which are to be formed into the shaped articles in order to strengthen the residual material areas surrounding the shaped aritcles and eliminate the necessity for unduly long cooling periods. This is of special significance if the wall thickness of the shaped articles is appreciably less than the thickness of the web. For example, within the scope of the invention, it is feasible to thermally form in a web about 2.5 mm thick shaped articles which are only 0.5 to 0.6 mm in wall thickness.

The cooling time required for the solidification of the materials being a quadratic function of the material's thickness, solidification of residual material that has remained at its initial thickness and temperature would require a cooling time about twenty times greater than the thinner shaped areas of the web. Even though it may not be absolutely indispensable that the residual material surrounding the areas of the shaped articles be completely cooled and solidified, a certain degree of cooling and solidification may be required in order to reliably convey the web with the shaped articles to the next treating station, for a stamping station. By precooling those web parts which are not to be formed, the time required for minimal cooling and solidification of the non-shaped parts of the web will be better related to the times requires for cooling the shaped articles. Precooling also allows appreciably better control of the shrinking effects occuring in the residual material.

A further object of the invention lies in providing precooling devices, which are to be mounted, in direction of conveying of the web, upstream of the thermal die means at the thermal forming station and which are moved synchronously with the thermal die means.

It is a further object of the invention to provide at least one cooperating pair of precooling device and counter-precooling device, which pair(s) comprise(s) cooperating related positive and negative shaping components in order to impart a framelike bracing structure into the web during precooling.

A further object of the invention lies in providing a novel In-Line and a novel apparatus of the kind described above for the continuous manufacture of thin-walled shaped articles from thermoplastic materials, where a. the stabilized web at the shaping temperature is passed through the thermal forming station in essentially vertical motion and where the shaped articles are formed out of the web in an essentially horizontal direction; and b. where the shaped articles simultaneously or within the same stage as thermal forming are separated from the web and may be further cooled even after this separation.

Thereby is created a novel feasibility of forming and processing relatively thick plastic webs, for example exceeding 3mm in thickness, by means of the above In-Line process. The shaping and working of such thick webs in the In-Line process offers the feasibility of manufacturing articles with depth dimensions much in excess of the diameters of the apertures or of other opening dimensions. The very thick webs shaped in the In-Line process however are especially soft and delicate and therefore prior to the invention could not be worked in ordinary thermal forming processes and machines, especially if the web had to be advanced horizontally. Nor was it possible prior to the invention to adequately solidify the areas of residual material surrounding the shaped articles for such thick webs during the In-Line process, so that the web with its shaped articles therein could be reliable conveyed to a further treating station. Nor was this possible in the absense of precooling the web in those areas which were not to be shaped. The vertical conveying of the web through the thermal shaping station and the cutting-out of the shaped articles all in one stage with thermal shaping, as well as post-cooling of the shaped articles, has provided new possibilities for the forming and working of very thick webs in the In-Line process.

A further object of the invention lies in achieving vertical downward conveying of the web, for a thermal forming apparatus of the kind described earlier, in order to minimize transportation effects on the web.

A further object of the invention lies in providing a thermal forming apparatus having a die support that may swing about a horizontal axis, such support holding two or more dies or multiple dies, rotational positions of the die support being provided for in each of which a die or a multiple die will be opposite the web to be shaped. This rotating die support allows leaving the shaped article after thermal forming proper in the die of a certain time and acts to cool it even further by contact with the die surfaces.

Finally, it is an object of the invention to provide devices for removing the shaped articles from the web in apparatus of the above described kind with vertical conveying of the web, embodying separators associated with the tools but thermally insulated from them and usually in the form of a recessed vertical plate, the dies being introduced in these recesses at their aperture rims with horizontal play, and the rims of these recesses providing separation edges coacting with the second parts of the separation devices. In this manner one obtains separation devices eliminating the difficulties that have been encountered prior to the invention in attempting thermal shaping and simultaneous separation of the shaped articles from the web. Neither part of the separation device need be heated during thermal forming, so that thermal expansion phenomena no longer need being considered. The two cooperating parts of the separation device may therefore precisely fit together during the entire operation of the machine and effect a smooth clean cut.

Further objects, characteristics and advantages of the invention will be found in the description below of several embodiments illustrated in the drawing. However, these embodiments should be considered illustrative only and in no sense restrictive of the scope of the invention.

BRIEF DESCRIPTION OF DRAWINGS

FIG. 3 is a diagrammatic view showing the method and apparatus in an embodiment incorporating three sources of thermoplastic material producing a composite laminated web;

FIG. 8 is a fragmentary view showing means controlling a compensating roller of a stabilization arrangement;

PREFERRED EMBODIMENTS

Figure 1:
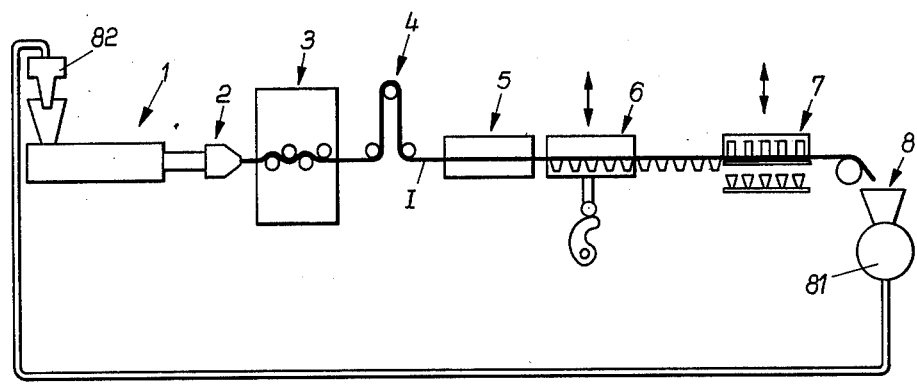
FIG. 1 is a diagrammatic view showing a method and apparatus for forming thin-walled articles from thermoplastic material wherein a thermoplastic web is initially formed from one source of material, according to one embodiment.

FIG. 1 illustrates the operational sequence and the basic design of the apparatus as constructed and arranged for the manufacture of thin-walled, thermoplastically shaped articles. It comprises at least one extrusion device 1 suitable for receiving granular thermoplastic material and compressing and heating it continuously until liquified. The liquified thermoplastic material processed by extrusion device 1 is conveyed into a web spraying mold 2, preferably fashioned as a fish-tail nozzle and provided with temperature regulators.

The hot plastic web I continuously issuing from nozzle 2 is immediately fed to a stabilizing station 3 where the web is stabilized by precooling its opposite surfaces in such fashion that thin partly solidified but still deformable supportive layers or shells of said thermoplastic material will be produced at those surfaces whereby the web already becomes self supporting, but the inner material of the web remains essentially at about the extrusion temperature and in a very plastic state.

The continuously advancing web from stabilizing station 3 is fed to a motion control feed conversion device 4 for converting the continuous advance of the web into intermittent advance.

The intermittently advanced web passes through a dwell station 5 where the recently formed and surface cooled stabilized web is subjected to a temperature compensation treatment and set for the proper surface temperature required for thermal shaping.

The web is then advanced to and subjected to thermal shaping at the thermal shaping station 6 where a mechanically acting stretching element may be applied to one web surface to urge the other precooled web surface against a shaping tool surface where it is further cooled. Alternatively the web at least temporarily may be subjected at the shaping station to compressed air at one of the precooled surfaces and thereby have its other surface pressed against the shaping tool surface where it is further cooled. The web is now fed into stamping station 7. Following stamping-out of the shaped articles at station 7, the residual web is brought to a receiving station 8 provided with a suitable device 81 for reducing the web material into granular form, so that this residual material may be fed back and recycled through a metering device 82 to mix with the fresh material at extrusion device 1 in a predetermined ratio.

Figure 2:
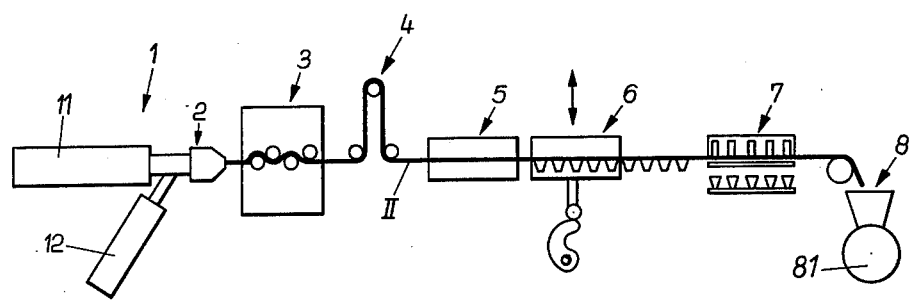
FIG. 2 is a diagrammatic view showing the method and apparatus in an embodiment incorporating two sources of thermoplastic material producing a composite laminated web.

A further embodiment is shown in FIG. 2. In this example, a first kind of thermoplastic material is compressed and heated until liquefaction in a first extrusion device 11 and extruded and conveyed under pressure to a slit-like nozzle 2. Thermoplastic material of a second kind is compressed and heated in a second extrusion device 12 until liquefaction and deposited in a layer as a sheath or strip on the surface of the web of first material upstream of nozzle 2. The superposed layers entering nozzle 2 are cast into a continuous composite laminated plastic web II issuing from nozzle 2.

Composite thermoplastic web II is now processed in succession through the stabilizing station 3, the feed conversion device 4, dwell station 5, thermal forming station 6 and stamping station 7 as in FIG. 1. The composite web so produced if formed at the stabilization station with opposite surface layers that are partly solidified but still deformable, and interiorly the different overlying thermoplastic materials are still substantially at extrusion temperature and their contacting surfaces remain quite fluid. The extrusion device of FIG. 2 may consist of more than two extruders discharging together into a composite web spraying nozzle 2.

A composite web II so manufactured may evidence properties at one or both precooled outer surfaces which are different from those at the hot plastic core. For example, where two different kinds of material are laminated, the first material may be a standard polystyrene, and the other material may be an impact resistant plastic such as a butadiene-rubber modified polystyrene. The composite web may also include outer layers of the impact resistant plastic on both surfaces of a standard polystyrene web, the precooled surface layers being formed on the outer webs while the materials internally of those layers all remain substantially at extrusion temperatures.

However, one may also make a composite web II with polyolefins, with for example polypropylene or polyethylene at the outer surface or surfaces, and with polystyrene or with polystyrene reacted with butadiene-rubber at the core. Adhesion of these differing thermoplastics may be achieved and/or improved by means of additionally and simultaneously extruded adhesives in a known manner. As is known per se, both polyethylene and polypropylene have the following properties:

a. their forming temperature range in the crystalline melting point range is narrow;

b. they must be shaped at high forming temperatures;

c. both, but especially polypropylene, may not be heated without air support in conventional thermal shaping because the foils will strongly sag shortly above the crystalline melting point which will cause marked, interfering folds in the die;

d. they require very even temperature distribution over the shaping surface (due to danger of crystalline residues and making folds).

The invention takes the foregoing into consideration and enables maintaining the temperature very evenly and sufficiently high for very small and controlled cooling, especially at the temperature compensation dwell station. There is no need to fear premature cooling of the web because the inner layer, whether of standard polystyrene or the impact-resistant polystyrene, will steadily and uniformly release heat to the outer polyolefin or other layer or layers. There is no tendency toward sagging of the composite web because the hot internal layer of the first material will not tend to sag even if the layer is subjected to the temperature required for shaping the outer polyolefin layer or layers (ca. 170° = 340° F). Parts shaped from a composite web II with a polypropylene outer layer or layers are particularly shape retaining at higher temperatures.

One may further achieve a composite web II where the outer surface thermoplastic material is a polycarbonate and the core material a standard polystyrene or an impact-resistant, butadiene-rubber modified polystyrene. Shaped articles may be made in this manner which will maintain their shapes up to temperature range of 130° to 135° C (266°-275° F), and will be weather-resistant, of high gloss and nevertheless economical.

As the polycarbonate foils are per se highly hydroscopic, the longer such foils are kept sandwiched, the larger the danger of bubble formation during thermal forming and the danger of reduced mechanical strength. The bubble formation, which is also determined by thermal decay, increases with foil temperature. However, the invention allows the processing of composite polycarbonate foils of the foregoing type without being subjected to these drawbacks, because:

a. there is no sandwiching of the web; and b. polycarbonates may be thermally shaped at relatively low temperatures, mainly because the internal or carrier layer may be thermally shaped because of the retained heat of extrusion.

The process of the invention when applied to composite webs with outer shells or layers of polycarbonate may be so carried out that the composite web surfaces are maintained nearly cold while the core however remains hot. This is an appreciable difference as compared to the processes discussed within the scope of the invention for forming web II having polyolefin outer layers, where the outer layers may be cooled essentially only slightly for stabilization and where core reheating may occur for thermal forming.

The scope of the invention also allows making the outer layer of layers of composite web II of standard polystyrene or of an impact-proof butadiene-rubber modified polystyrene of a shaping temperature in the range 130°-140° C (266°-284° F), while the core material may be poly-alpha-methylstyrene with a shaping temperature in the range 170°-180° C (338°-356° F). Besides good thermal shaping properties, articles made from such composite webs evidence mechanical qualities previously unattainable.

FIG. 3 shows a further modification of the apparatus for manufacturing the plastic web, with devices for uniting several extruded web components of different or the same materials into a composite web III. Extrusion device 1 here consists of three extruders casting their web components through wide slit nozzles 21-23 to form three thermoplastic webs that are superposed and moved over a pressure roll pass 24, 25 which, when applying slight pressures to each of the individual webs, unites them into a single multilayer composite web III. Further processing of this composite web proceeds in the same manner as for the webs in FIGS. 1 and 2.

Referring to FIG. 3, one may compress and heat a thermoplastic material of a first kind to liquefaction in extruder 11 and then cast it as a plastic web component from slit-like nozzle 21. A thermoplastic material of a second kind may be compressed and heated to liquefaction in extruder 12 and cast as a second plastic web component from slit-like nozzle 22. Either the thermoplastic material of this second kind or one of a third kind may be compressed and heated to liquefaction in extruder 13 and cast as a third plastic web component from slit-like nozzle 23. In this manner may be combined even the most diverse materials which may also differ markedly with respect to temperature behavior.

It is important that extrusion of the continuous hot thermoplastic webs I, II is executed at the upper temperature limit of the temperature region in which the respective material is in a plastified condition. This region is indicated at $\gamma$ in FIGS. 4A and 4B. This means that when exceeding such upper temperature limit plastified material as it leaves the nozzles cannot be in the form of a web capable of being shaped. This also means that the extrusion temperature is such that the web leaving the nozzle 2 of FIGS. 1 and 2 or leaving nozzle 313 of FIG. 24 or leaving nozzles 21, 22, 23 of FIG. 3 in any case is strong enough and sufficiently self-supporting to be transported to the chilling and stabilizing station 3.

The absolute values of extrusion temperature increase are different from material to material and there may be many different types of the same kind of material which must be extruded at different temperatures.

In an example, standard polystyrene (general purpose polystyrene 165 H of BASF) may be extruded at an extrusion temperature in the range of 200° to 220° C, the temperature being usually dependent of the type and batch of material and thickness of the web, but when running in a production line for making thin walled articles according to the present invention one may begin at 200° C and carefully increase the extrusion temperature so long as stable processing is maintained. The temperatures at the cooled web when entering the thermoforming step may be 115° to 140° C while the core material is 140° to 170° C, a minimum difference of about 25° C being maintained in the range.

In a further example, in a mixture of 50% general purpose polystyrene (BASF 165 H) and 50% high impact polystyrol (BASF 476 L), the relative extrusion temperature and core and outer surface layer temperatures are about the same as in the first example.

Figure 4A:
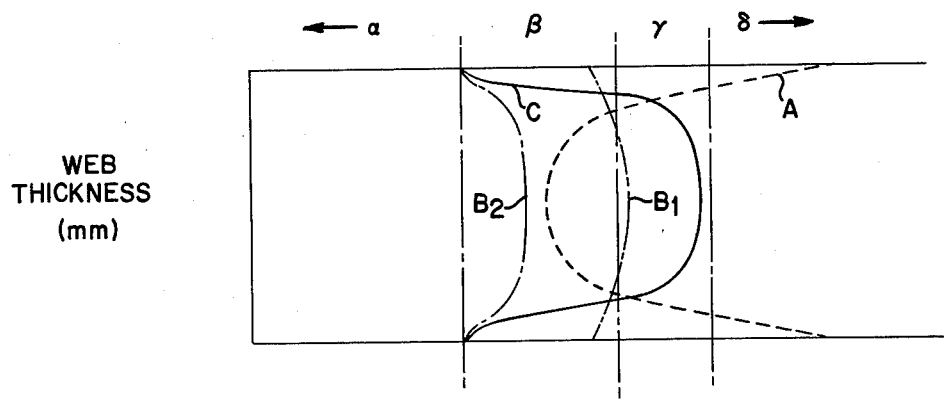
FIGS. 4A and 4B are graphic views illustrating temperature relationships in a thermoplastic in the invention.
Figure 4B:
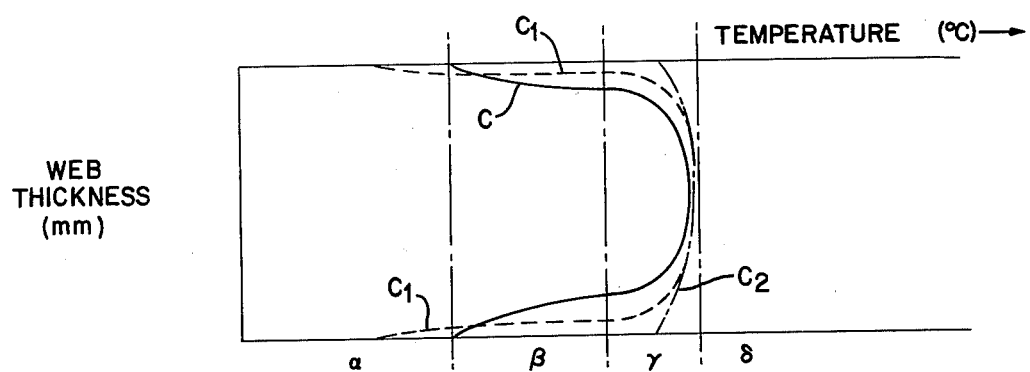

An important feature of the invention is that the plastic web after having left the extrusion nozzle is not only precooled but it is rapidly and uniformly chilled at both its surfaces. Such chilling means that in the relatively thin outer surface regions along the web the temperature of the material is rapidly and suddenly decreased below the lower limit of the formability temperature range. When the thermoplastic material is so cooled it exhibits moe or less steady transition regions between the outer thin solidified elastic layers and the still hot fluent liquid core. The various temperature identifiable conditions present in the web in the invention are illustrated in FIGS. 4A and 4B where:

$\alpha$ is the solidified condition range;

$\beta$ is the elastic plastified condition range in which the material is thermoformable and some molecular orientation is caused when shaping the material especially when deep drawing;

$\gamma$ is the plastified fluid condition range in which the material is extrudable so that no molecular orientation is caused during extrusion, and $\int$ is the liquid condition range.

FIG. 4A is a diagram graphically illustrating temperature gradient conditions across different plasticized webs.

Curve A shows the temperature gradient in a plasticized web heated by the previously conventional method of surface irradiation. It will be noted that the outer surface temperature is appreciably higher than at the center of the web. Because conventional processes for shaping require a minimum forming temperature to be present at the web center, the temperature at the web surfaces must necessarily be appreciably higher in view of the poor thermal conductivity of thermoplastic materials.

Curve $B_1$ of FIG. 4A shows the temperature gradient in a plasticized web which had been extruded in a conventional method and is thermoformed directly. In such extruding and direct thermoforming the extrusion temperature is controlled to be as low as possible in order that the extruded web can be manipulated to be transported to the thermoforming means. In such methods (known by German Auslegeschrift No. 1,165,241 and Shelby U.S. (Pat. No. 2,891,980) the web temperatures are as low as possible during extrusion so that the web may be immediately fed to the former.

Curve $B_2$ of FIG. 4A shows the temperature gradient in a plasticized web made by extrusion similar to that discussed above in connection with curve $B_1$, but after the web has been precooled as it has already been proposed by Crenshaw U.S. Pat. No. 3,354,693. Such precooling causes the temperature at the inner regions of the web to decrease substantially due to heat transport during the precooling time. After the material attains a temperature gradient as shown by curve $B_2$ shaping is only possible if the web is not deeply formed, but for deep-drawing or other deep thermoforming the material must be cooled so much that the article wall would be stretched at an intolerable rate.

Curve C of FIG. 4A shows the temperature gradient in a plasticized web which in accord with the present invention has been prepared for thermoforming. Such a web has been stabilized by chilling over its entire opposite surfaces directly after it has been extruded from the nozzle. Such chilling results in two outer stiffened supporting surface layers or shells and a very warm web core. As chilling involves a very rapid temperature decrease at the web surfaces there is no time for heat transport from the inner core region to the outer suface regions of the web during the chilling step. For this reason the surface layers or shells are relatively thin.

When thermoforming a web having a temperature gradient as shown in curve C, the thermoplastic material of the outer surface layers is in a somewhat elastic plasticized state or condition. When deep-drawing or otherwise thermoforming in such relatively low temperature material there is caused a characteristic molecular orientation with respect to the drawing direction. Such molecular orientation will also occur in the somewhat inner regions which will be cooled during the deep-drawing or other thermoforming whereas the innermost hot core material will remain in relatively fluid plasticized condition and will be redistributed during the last step of thermoforming, when the preshaped outer shell portions are pressed toward each other and relatively shifted with respect to each other. Thus the fluid inner core material provides a very uniform material distribution and the shaping steps are finished before such hot inner core material has cooled sufficiently to develop molecular orientation. Additionally the lower temperatures indicated by curve C for the supportive web surfaces and the maintenance of relatively high temperatures at the core also decreases the sensitivity of the web with respect to area tempering through cooling with cold dies. The lower web surface temperature ensures that, upon touching the cold die surfaces, no undue amount of heat will be transferred from the web to the dies, particularly locally. Also the hot fluid core acts as a heat reservoir to effectively reheat the outer surfaces as the web moves from the chilling station, and such removes the danger of there being chill marks on the product article surfaces.

The surface temperatures during forming are relatively low and the temperature differences with respect to the cool die surfaces at the shaping station are advantageously low. This eliminates to a great extent the danger of setting up stresses in the final product. The two outer supportive surfaces undergo stretching in the shaping process and are connected to each other by the relatively fluid elastic core that remains heated extremely close to the melting point or extrusion temperature, so that each of these surfaces may be differently shaped so as to correspond with a desired end product. A very uniform material distribution is thus otained, with no voids or weakened regions, the attainment of which has always presented a serious problem in previous processes using thermal forming.

FIG. 4B shows curve C in comparison with some temperature gradient curves which could be realized during the several steps of the method according to the present invention. Curve $C_2$ shows the temperature gradient in the plastic web when leaving the extrusion nozzle. In the invention this extrusion temperature is much higher, for example 50° higher, than the normal extrusion temperature for such material such as is used in the Crenshaw patent process for example. As may be seen from FIG. 4B the extrusion temperature is very close to the upper limit of the extrusion temperature range $\gamma$ in which the extruded material is in a fluid condition, whereas in the upper temperature stage $\int$ beyond the above mentioned limit the material would be so fluid and liquid that it merely would drop down when leaving the extrusion nozzle and would not be able to hold together and support itself as a web. Immediately after leaving the extrusion nozzle the web is stabilized by being chilled at both its surfaces by contact with cool heat transferring surfaces. By such chilling a desirable temperature gradient across the web may be realized as shown in curve $C_1$.

As thus may be seen from curve $C_1$ on each of the web surfaces a thin outer surface layer is produced which is so cool that the material is in a solidified condition at a temperature below the somewhat elastic plasticized condition of the thermoforming temperature range $\beta$. This means that after chilling the outer surface layers of the web at first may be so hard that they would not be thermoformable, whereas the main part of the material is maintained practically fluid at its extrusion temperature extremely close to the upper limit of extrusion temperature range. In such condition the web may be easily transported and manipulated, but experience has shown that it would not be advisable to thermoform the web in the condition of curve $C_1$.

Figure 4C:
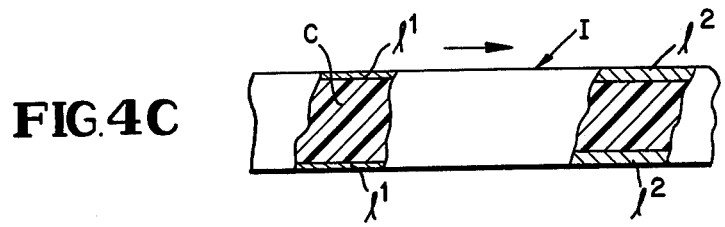
FIG. 4C is an enlarged fragmentary view partly in section illustrating internal web conditions.

During transportation of the web from the chilling station 3 to the thermoforming station 6, heat balancing distribution will occur in the web. This means that some heat is transferred by conduction from the hot core c to the cooled surface layers 1. This heat transfer results in the web attaining the condition of curve C in FIG. 4B, wherein the outer surface layers have been reheated to a temperature in the range $\beta$ and are in elastic plastic condition. The outer surface layers 1 built up by the material in the somewhat elastic plasticized condition and within the temperature range $\beta$ may become progressively thicker as illustrated in FIG. 4C and such built up material will become reheated by heat derived from the core to a temperature preferably substantially at the lower limit of the temperature range $\beta$. Due to such reheating the surface layers may be readily thermoformed with development of molecular orientation as pointed out above. The foregoing reheating step takes place mainly at the dwell station 5 in FIGS. 1-3.

Figure 5A:
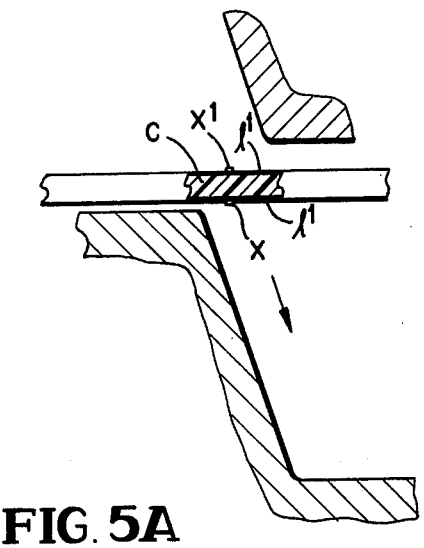
FIGS. 5A and 5B are enlarged fragmentary views in section illustrating web shaping operations.
Figure 5B:
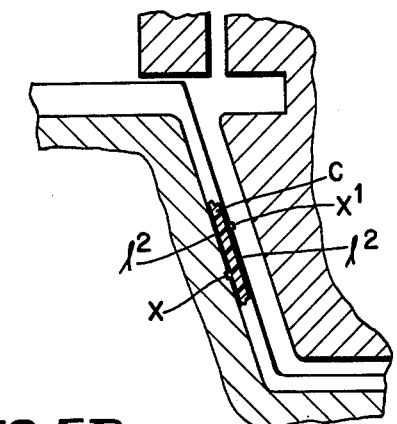

FIGS. 5A and 5B diagrammatically show the behavior of a composite web of the invention during the thermal shaping or drawing operation at station 6. Points or regions X and X' at opposite surfaces of the web, which as shown in FIG. 5A were directly opposite one another prior to the thermal forming process, have been relatively shifted during forming in accordance with the geometry of the desired article as shown in FIG. 5B. Effectively the opposite shells of the web, whether a single component or composite web, may thus be differently shaped without undesirably stressing the web. The core's temperature is very near the melting or extrusion point and during thermal shaping the relatively elastic fluid core will be distributed evenly and freely by stresses acting between the two relatively moving outer layers or shells at the outer surfaces. At the relatively cool outer surface layers 1' of the web during drawing or other thermoforming, molecular orientation is caused, substantially in the drawing direction. As forming proceeds the web progressively cools and the outer surface layers are further built up in thickness as shown at $1^2$ in FIGS. 4C and 5B. As the surface layers increase in thickness the outermost regions will have a very strong molecular orientation and the inner regions of such surface layers will have less molecular orientation. Summarizing, this means that a wall condition of the article can be obtained in which the outer surface regions have a strong molecular reorientation and there is a continuous gradual transition to little or no reorientation to the inner wall region.

Articles shaped in accordance with the invention will therefore break or rupture much less rapidly than those manufactured conventionally, especially since the latter suffer from oxidation disintegration due to the high surface temperatures and from the ensuing brittleness usually affecting deep drawn articles.

Figure 6:
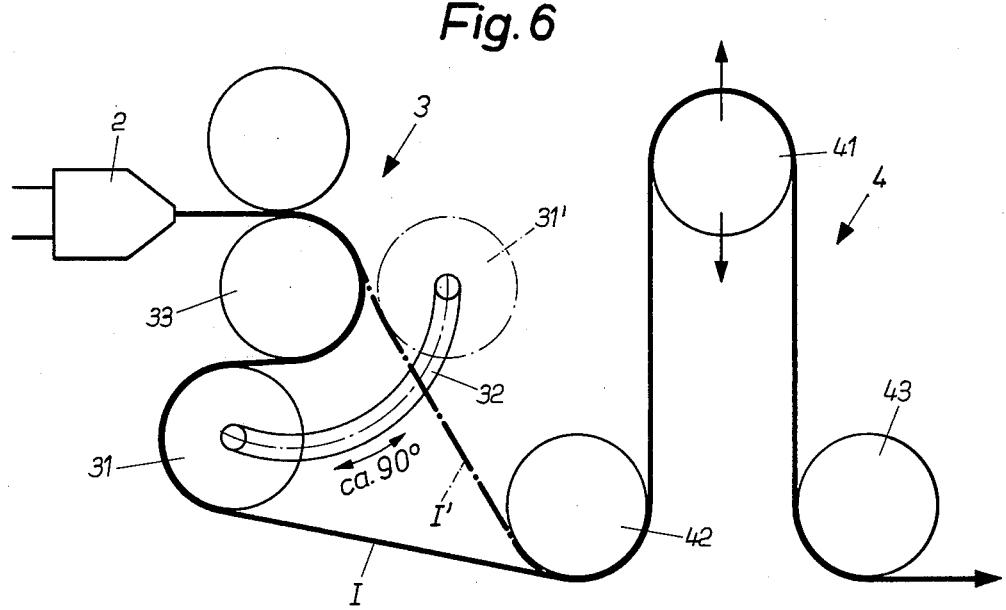
FIG. 6 is a fragmentary side view showing an arrangement for web stabilization.

FIG. 6 shows apparatus for the stabilization of the continuously moving hot plastic composite web I at station 3. The web is stabilized immediately upon leaving nozzle 2 and it is made to pass through a surface cooling arrangement, here in the form of rollers that cool opposite web surfaces similarly and the relative positions of which may be adjusted to vary the heat conducting and heat exchange areas of contact, by changing the web areas in contact with rollers 31 and 33 without changing the length of the continuously moving web between roller 33 and roller 42 of the next station 4. The angular extent of web looping around the cooling rolls may be set as needed to achieve this result in the apparatus of FIG. 6. A rotatable cooling roller 31 is slidably movable along a guide 32 essentially in the shape of a circular arc of about 90° extent around the center of an opposite fixed axis rotatable cooling roller 33. A displaced position of roller 31 is shown in dot-dash lines at 31' and the corresponding changed path of the web indicated at I'. This illustrates the infinite adjustability of the cooling arrangement.

The stabilization apparatus is followed by apparatus for converting the continuous web advance into intermittent or step-wise advance as by compensating roller 41 and deflection rollers 42 and 43 as will be described later.

Figure 7:
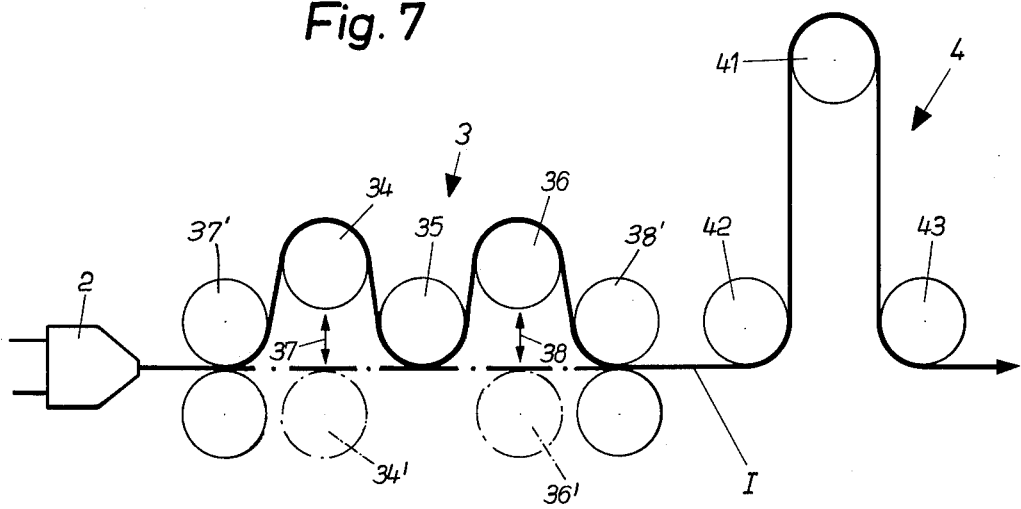
FIG. 7 is a fragmentary side view showing another arrangement for web stabilization.

FIG. 7 shows a modification of the apparatus for stabilizing a hot plasticized composite web. Web I in this example is guided horizontally as by a V-shaped arrangement of rotatable cooling or tempering rollers 34, 35 and 36. These latter include essentially a tempering roller 35 axially fixed in position above web I and two rollers 34 and 36 located respectively between fixed axis guide rollers 37' and 38' and the fixed axis tempering roller 35. Rollers 34 and 36 are suitably mounted for vertical adjustment between the lower dot-dash line position shown in FIG. 7 at 34' and 36' respectively and the upper solid line position, as indicated by the double arrows 37 and 38. Thus, different areas of contact between the cooling rollers and continuously moving web may be obtained whereby the opposite surfaces of the web may be simultaneously and similarly precooled or surfaced tempered at to effect different shell compositions or outer supportive layer thicknesses along the opposite surfaces. Besides altering the length of the heat exchange contact of the web surfaces with all of the cooling rollers, the same effect may be attained by changing the looping angle of the web around any cooling roller. It is also possible to control the stabilization process by varying the temperature of the cooling medium in one or more of the cooling rollers without adjusting the areas of web contact, or in association with such adjustment. This could be done for example by connecting roller 33 or 31 or both to internally received cooling liquid from a source having a control for varying the temperature of the cooling liquid.

FIG. 8 shows a control apparatus at station 4 for the purpose of converting continuous web advance into step-wise advance. The compensating roller 41 shown here preferably is controlled by means of the illustrated belt or chain drive, sprocket wheels being mounted at the front side of compensating roller 41 and at the front sides of fixed axis guide rollers 42 and 43. The sprocket at 42 is continuously driven. The sprocket at 43 is intermittently driven at a frequency corresponding to the dwell time needed for the operations at the succeeding temperature compensation, thermal shaping and cutout stations. Compensating roller 41 is suitably guided for free movement vertically as indicated by the double arrow 44. The compensating roller 41 may be so controlled as by suitable biasing springs (not shown) that the web will be fed substantially free of tension. It must be arranged in this respect that output of the thermal forming device 6 and that of the extrusion device will be so correlated that the compensating roller 41 never reaches one or the other possible vertical terminal positions even during long time operation. It may happen that rapid and intermittent motion past the dwell station 5 into the thermal shaper at 6 will cause high accelerations. The weight of the web must be added to these effects, and the limit may be set by the inherent weight of the web, so that it may not be subjected to stretching when rapid step-wise motion occurs. To prevent this from happening, compensating roller 41 is employed, and especially when dealing with thin webs, it will preferably operate from top to bottom, because the momentary acceleration during motion is near in value to the acceleration of free fall ($g = 9.81$ m/sec2), so that the weight of the web and the forces of acceleration will compensate, and for exact compensation, the web will be more or less in free if controlled fall. The compensating roller 41 and the guide rollers 42 and 43 in every case preferably are as nearly as possible thermally neutral, that is, they may neither heat nor cool the web. This is preferably achieved by using a very thin sheet metal roller at 41 with an insulator covering such as felt or another testile that will very rapidly reach a certain temperature and thereafter neither withdraw nor impart heat from and to the web.

Since roller 41 is spring biased upwardly in FIG. 8, as the web is continuously fed toward it the roller 41 will rise vertically to increase the loop between rollers 42 and 43. Then as the intermittent feed at 43 is actuated the web will be pulled out of the loop faster than it enters it, such being controllably permitted by roller 41 displacing downwardly to shorten the loop for the period of the intermittent feed stroke. This cycle is repeated at each intermittent web feed stroke. It will be understood that the invention in its broader phases contemplates any suitable intermittent web feed apparatus at station 4.

FIGS. 9–12 are illustrative of an important phase of the invention relating to the dwell station 5 where the opposite web surfaces are treated for providing uniform temperature thereacross.

In thermal forming it is extremely important and desirable that there be as completely uniform temperature across the web surfaces as possible. At station 5 the web is treated for that purpose.

Figure 9:
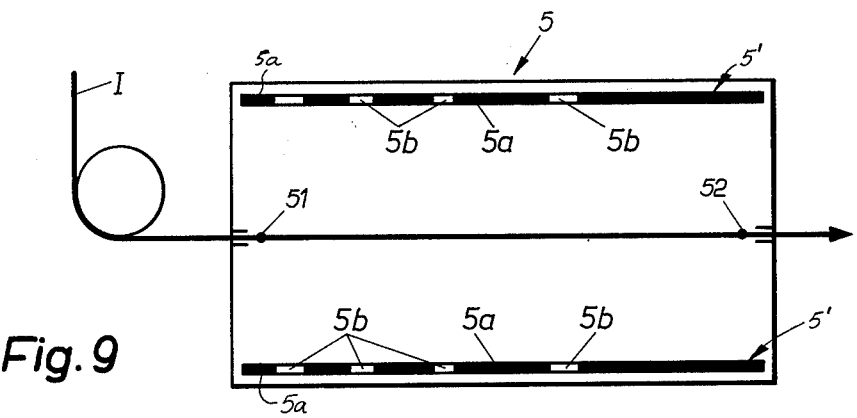
FIG. 9 is a fragmentary side elevation showing a dwell station in the forming apparatus.

As shown in FIG. 9 the web, which at this point is relatively warm since it consists essentially of a hot plastic inner core having thin supportive layers or shells on and along opposite surfaces, passes horizontally between similar upper and lower parallel reflector members 5' having their reflecting surfaces facing the adjacent web surfaces. The reflectors may be polished aluminum which are good heat reflectors. As shown in FIG. 9 each reflector member 5' is provided with a series of increasingly spaced non-reflective areas or spaces 5b that provide successive reflecting areas 5a of increased size from left to right whereby radiant heat from the web will be proportionately reflected back to the web surfaces in varying degree by the different size reflecting areas 5a.

In operation with a section of web disposed between reflector members 5' as illustrated in FIG. 9 it will be appreciated that the amount of heat per unit area radiated from the web at region 51 is greater than that radiated per unit area at region 52, for the reason that region 52 is more distant from the extrusion device and hence has had time to cool down more than region 51. By providing smaller heat reflective areas 5a opposite the warmer web portions and gradually compensatively increasing those areas in size toward the cooler web portions, the web surfaces between the reflector members are raised to uniform temperatures over their entire areas. The same effect may be produced by making reflection areas 5a of increasingly greater heat reflective value, instead of increased size, from left to right in FIG. 9.

Figure 10:
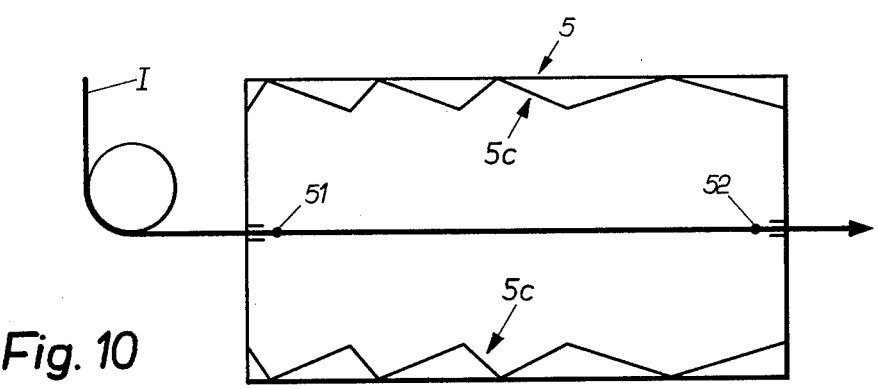
FIGS. 10, 11 and 12 are fragmentary side elevations showing three different forms of dwell stations.

A further possibility for the dwell station 5 is shown in FIG. 10. In this instance zig-zag reflectors 5c of various angles are used, the changing relative angular positions of the reflectors progressively determining the desired reflectivity, such that more heat will be reflected back to the web at the right side of the station opposite web region 52 because of the more oblique position of the reflectors with respect to the colder web region 52.

Figure 11:
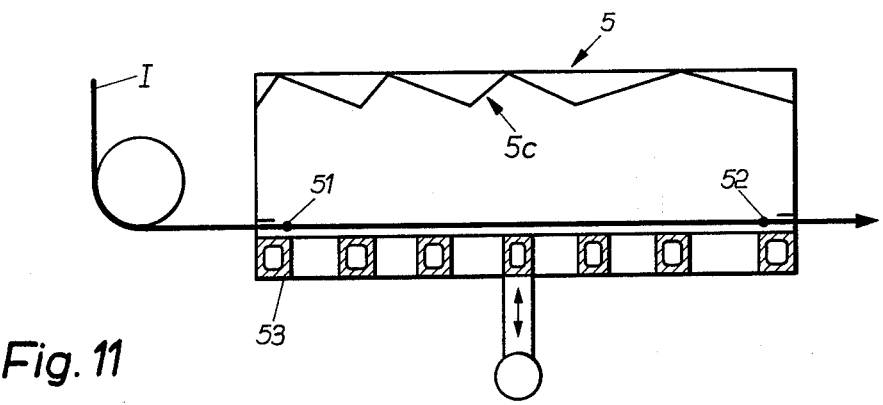

Another advantageous embodiment of dwell station 5 is shown in FIG. 11. The lower web surface, which will face the tool in the thermal forming station 6 later to be described, contacts a tempering device 53 for heat exchange by conduction, and only certain areas of the web, for instance only the areas to be shaped or the edges will be maintained a fixed temperature, which may deviate from that of the remaining areas. In this manner it is possible to achieve extremely favorable shaping of the web. The web contacting areas of device 53 are maintained at the desired temperature by passing a heated fluid through the illustrated passages.

Figure 12:
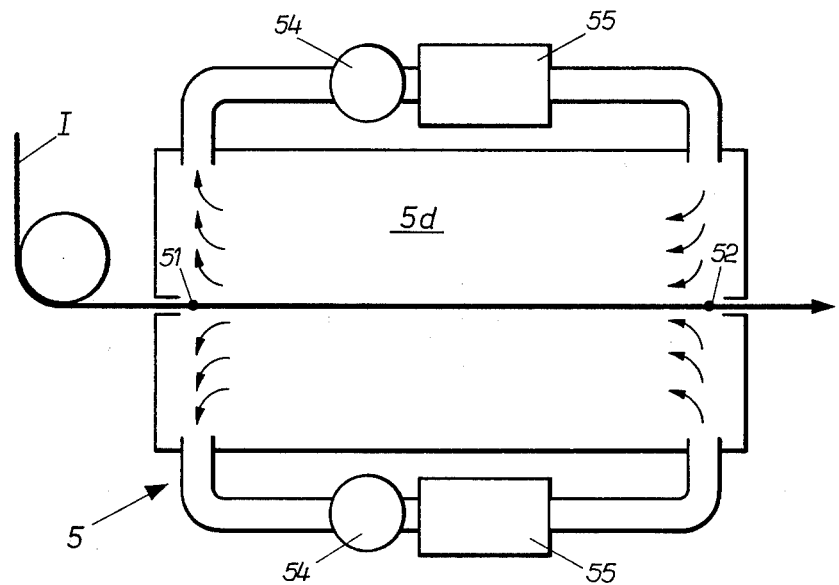

A further embodiment of dwell station 5 is shown in FIG. 12. Depending on the characteristics and properties of the thermoplastic web, certain materials may require an air circulation chamber keeping the plastic web at a constant temperature. This applies particularly to polymers for which thermal shaping must take place in an extremely critical temperature processing range. It is known for example that modified polystyrene allows a temperature range of $\pm 10°$ C (18° F) within which the product will not be affected. This temperature range is still more narrow for polyolefins and polycarbonates, so that the above disclosed reflector arrangements may not suffice. The station 5 circulation chamber is not meant to increase temperature overall but rather to maintain a desired temperature by compensatively distributing the warm air over the web surfaces between regions 51 and 52. The web suface temperature distribution will be the most uniform if the circulating air is made to move in a direction opposite to the advance of the web as shown by the arrows in FIG. 12. There may be one fan 54 and one heater 55 for each of the upper and lower parts of chamber 5d to set circulation at the required degree.

Figure 13:
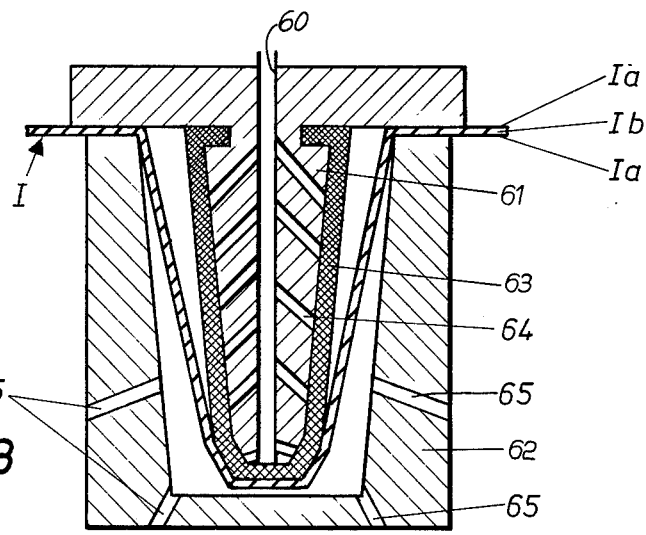
FIGS. 13 and 14 are sectional views illustrating two different aspects of thermal forming.
Figure 14:
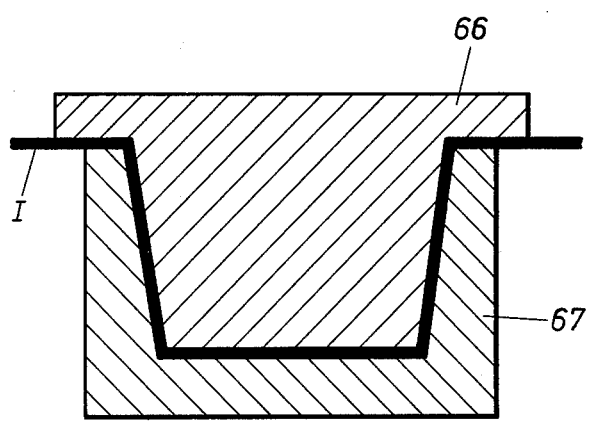

Various possibilities are diagrammatically shown in FIGS. 13 and 14 for thermal shaping at station 6. A negative die is shown in FIG. 13, working together with a stretching element 61 which is coated at the web engaging surface with a heat-insulating, porous layer, for example a felt layer 63. Element 61 is provided with an inlet bore 60 and branching bore holes 64 adapted to be connected to supply compressed air which will be finely distributed by the felt covering 63. The interior of the negative die 62 is provided at the other side of the web with evacuation bores 65 allowing timed application of vacuum. The design and the operation of such shaping devices are known per se. However, as shown in FIG. 13, in the invention the outer layers Ia of the web are like shells holding between them the hot fluid plastic core Ib. When compressed air is supplied through bore 60 and vacuum is connected to bores 65 the felt layer 63 and the cooled metal inner cavity surface of the die negative 62 contact the opposed shell like surfaces of the web to form the article shape. This action causes distribution of the external mechanical forces in the plastic core Ib, which in turn enhances internal distribution of the plastic between the shells when the web is pressed against the inner surface of die 62 under the combined influence of the vacuum bore 65 and pressure from bore 64.

The example of FIG. 14 shows a positive forming device with coacting positive and negative rigid die elements 66 and 67. The positive stamping tool or male die 66 and the negative stamping tool or female die 67 are in intimate contact with the opposite shell-like outer surfaces Ia of the plastic web, so that these outer surfaces will take on the form of the dies 66 and 67. During pressing of the latter toward each other, the plastic core of the web will be distributed between the shells and in practice the fluid plastic material of hot core Ib acts hydraulically on the shell like outer surfaces and therefore ensures very good and solid contact with the surface contours of dies 66 and 67.

The forming devices shown in FIGS. 13 and 14 are only examples. Any known thermal shaping process or any known thermal shaping equipment may be applied within the scope of the invention. The process of the invention in substantially every case will provide advantages because of the pre-formed shells or outer supportive surfaces of the web to be formed.

Figure 15:
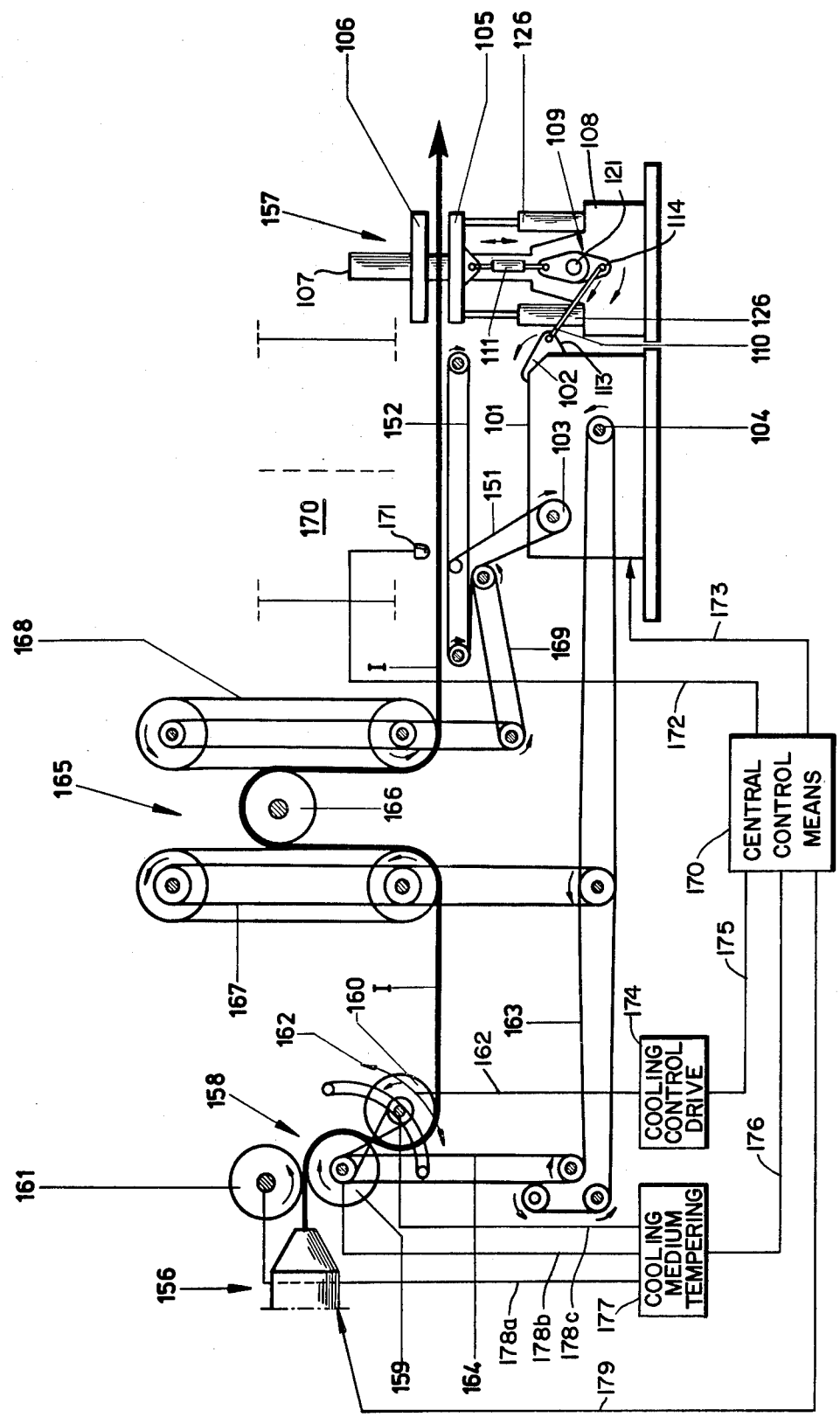
FIG. 15 is a diagrammatic side elevation showing a drive system for a thermal forming device in association with a thermoplastic web casting machine for producing the web to be shaped.
Figure 16:
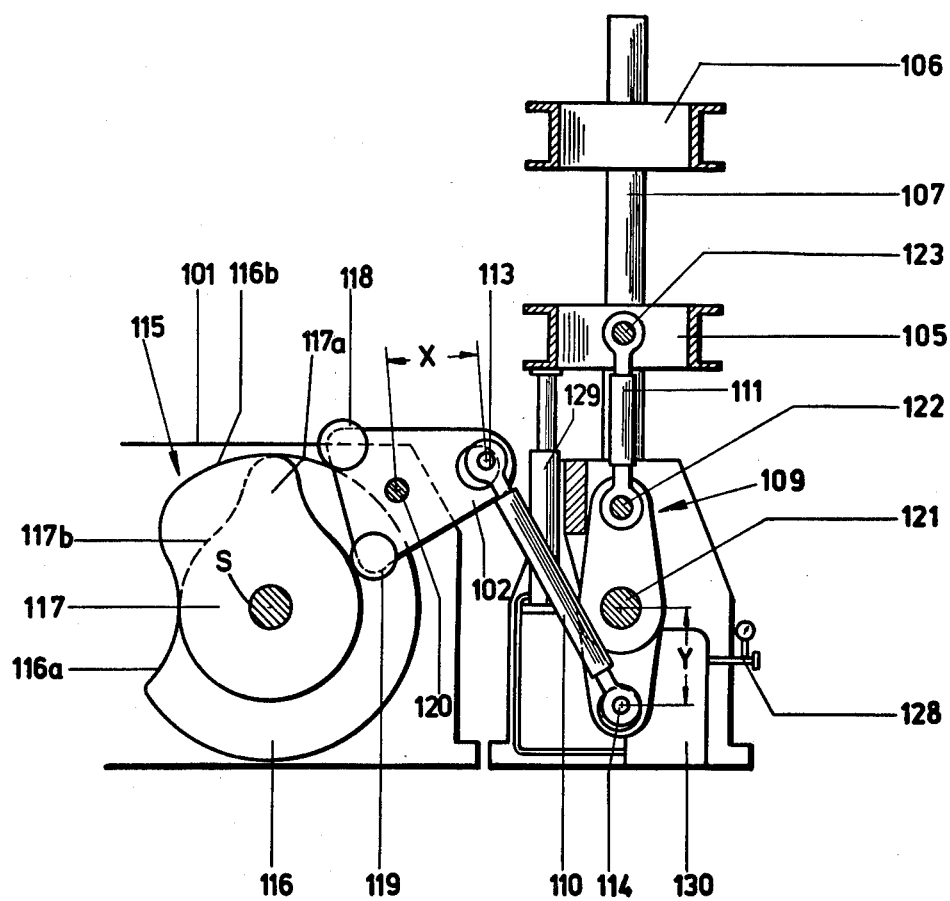
FIG. 16 is a side elevation partly in section showing the drive system for thermal forming means with some modification.
Figure 17:
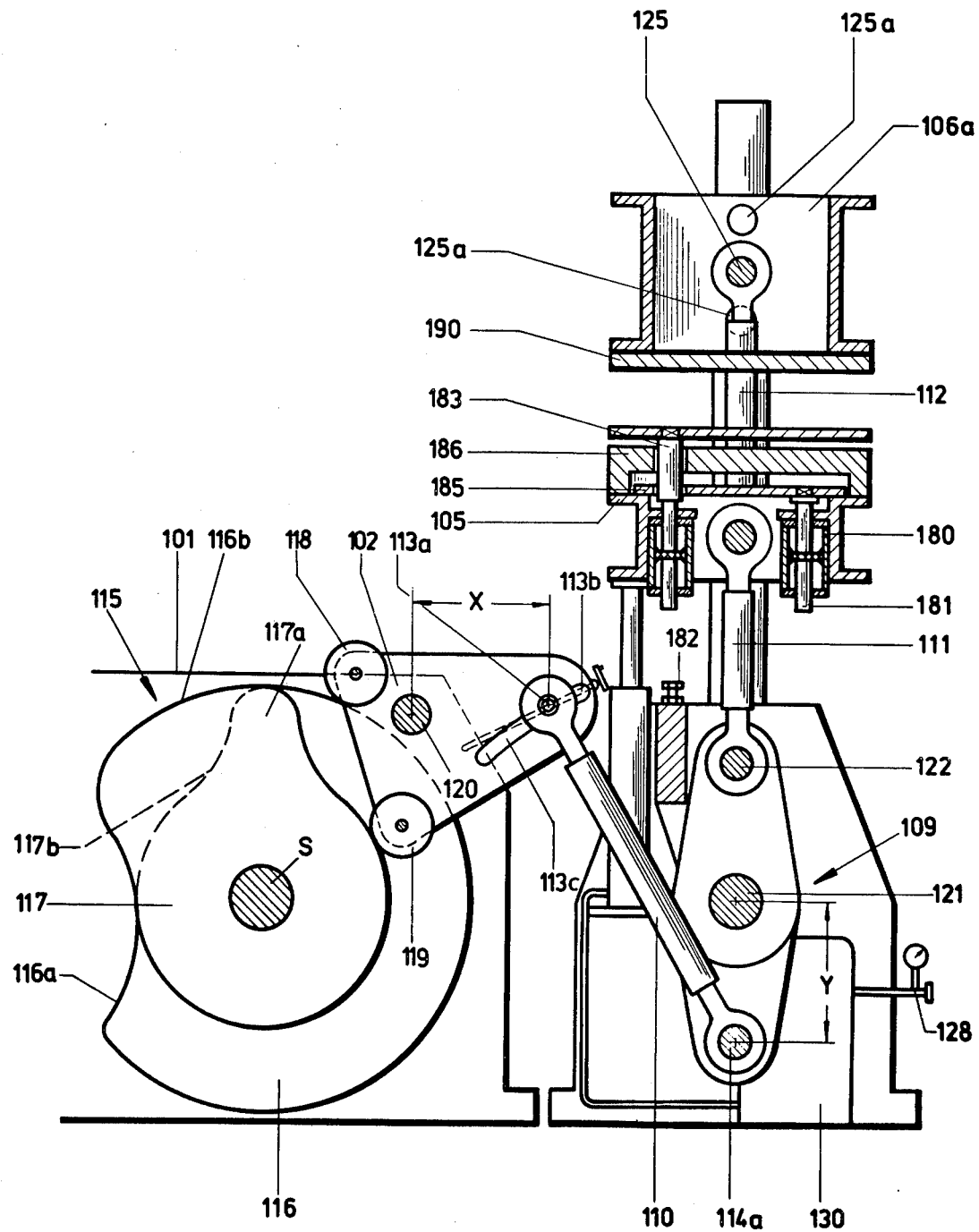
FIG. 17 is a side elevation partly in section showing a thermal forming means that is a variation of that of FIG. 16.

Referring first to FIGS. 15–17, the main drive for the thermal forming apparatus comprises a cam and gear unit 101 powered by an electric motor (not shown). An output lever 102 controlled by cams inside the unit as will appear actuates the forming dies, and output sprockets 103 and 104 respectively provide sources of intermittent and continuous web movements as will be described in detail. Vertically movable on one or more stationary columns 107 rigid with the machine frame 108 are a lower die support 105 and an upper die support 106, and the composite web I passes between them to be intermittently stopped for the article forming operation of station 6 of FIG. 1. The dies or tools shown in FIGS. 13, 14, 20 or 21 respectively may be mounted on the supports 105 and 106, or other suitable shaping devices may be provided there.

Lever 102 is pivoted on fixed axis at 120, and is pivotally connected at 113 to one end of a link rod 110. The other end of rod 110 is pivotally connected at 114 to one end of a lifter lever 109 pivoted intermediate its ends on a fixed axis shaft 121. The other end of lever 109 is pivotally connected at 122 to the lower end of a lift rod 111, and the upper end of rod 109 is pivotally connected at 123 to the lower die support 105.

FIG. 15 shows the drive means used in connection with the present invention for a thermal shaping machine 157 following a plastic web extruder 156. A thermal shaping machine of this type is disclosed in Thiel U.S. Pat. No. 3,836,309 issued Sept. 17, 1974. A cooling and stabilizing device 158 is connected to the plastic extruder, comprising an idle counter-pressure roller 161 functioning together with the first cooling roller 159 to pass the extruded web. The second cooling roller 160, as shown by double arrow 162, may be adjusted with respect to roller 159, in order to vary the looping angle of the web around both cooling rollers 159 and 160 as in FIG. 6. Roller 159 is continuously driven from the continuously rotation sprocket wheel 104 of the cam and gear unit 101, as by the chain drive connection 163, 164.

A motion converter 165 similar to that of FIG. 8 is connected to follow the cooling stabilizing device 158 and comprises an upward moving compensating roller 166. Compensating roller 166 is held in a continuous chain arrangement 167 on its input side facing the spray-casting device 156, that chain being driven from the continuously running chain linkage 163. On the output side facing the thermal shaping machine 157, compensating roller 166 moves in an intermittently operating chain arrangement 168 which is driven in turn through drive 169 connected to intermittently operating chain 151 of advance device 152. Because of the continuous drive of the chain arrangement 167, the compensating roller will be steadily lifted in accordance with the supply of the continuously moving web, as long as the intermittently operable advance device 152 is stationary. When the thermal shaping machine 157 operational sequence actuates the web advance device 152, the second chain arrangement 168 of the compensating roller will also start running and this causes the compensating roller to be lowered in proportion to the web section to be supplied to the thermal shaping machine 157. The total web advance is the same for both kinds of motion. This is ensured by design of the drive devices of the cam and gear unit connected to sprocket wheels 103 and 104.

FIG. 15 shows an upwardly biased (springs not shown) compensating roller 166. Motion converter 165 takes up the continuously supplied web arriving at constant average speed as compensation roller 166 moves upward, also overcoming the web inherent weight. During intermittent withdrawal of the web, the more or less jerky motion occurs downward, that is, in the direction of the inherent weight of the web due to gravity.

As shown by FIG. 15, the intermittently operating conveying device 152 for the web may be of such length upstream of the thermal shaping machine 157 that if necessary a temperature compensation dwell station 5 may be placed between motion converter 165 and thermal shaping machine 157. This compensation and stopping station may be of such length as to correspond to a single section or to several sections of an advance step of the web effected by belt 152.

Referring to FIG. 16, output lever 102 carries at opposite corners a pair of cam follower rollers 118 and 119 that respectively engage cams 115 and 116 mounted on a shaft S continuously driven by the electric motor. Rotation of shaft S causes selective cyclic rocking of lift lever 109 during the forming operation, the nature of the rocking movement being controlled by cams 116 and 117.

The location of cam follower rollers 118 and 119 and the contours of cam disks 116 and 117 are so determined with respect to one another that the cam follower rollers will always be in contact with the peripheral surfaces of the respective cam disks during operation. When roller 118 enters a radially recessed part 116a of its cam 116, roller 119 will be in contact with a radially projecting part 117a of its cam 117. Roller 119 proceeds inversely on a radially recessed part 117b of its cam 117 when roller 118 runs on a radially projecting part 116b of its cam 116. In operation the movements of lever 102 under cam control are transmitted through eccentric pin 113 to link rod 110 which in turn acts through eccentric pivot 114 to rock lifter 109 and actuate the die supports. Cam 115 is continuously rotated by the electrical motor, while the vertical motion of die supports 105 and 106 is solely determined by the peripheral shape of cam disks 116 and 117. Operational synchronism of die supports 105 and 106 may be varied by a continuously adjustable speed reducer inserted between the motor and cam 115, or by changing the motor speed.

The eccentric pivot connections at 113 and 114 are adjustable as by rotatable and clampable eccentric pivot means. As shown in FIG. 16 adjustment of eccentric pivot 113 may vary the length of effective lever arm X between pivots 113 and 120 of lever 102, while adjustment of eccentric pivot 114 may vary the length of effective lever arm Y between pivots 114 and 121 of lift lever 109.

If lever arm X is set at its maximum length and lever arm Y is set at minimum length, such will result in maximum lift of die supports 105 and 106. If lever arm X is set at minimum length and lever arm Y is set at maximum length, such will result in minimum lift of the die supports.

The lift range may be continuously adjusted between minimum and maximum. By selecting the eccentric magnitudes with respect to the minimum values for the lever arms X and Y, the range of the lift adjustment may be determined. In a current machine, a lift adjustment in the ratio of 1:1½ minimum: maximum is used.

To achieve self-locking performance of the dies, shaft 121, pivots 122 and 123 of lift rod 11, and pivtos 124 and 125 should be in a single, preferably vertical, plane in the closed position of the dies as shown in FIG. 16. To achieve this, link rod 110 is adjustable in length, so that for any adjusted position of eccentric pivots 113 and 114, the desired self-locking position of the parts may be set when the die is closed. So as to have the capability of setting die support 105 for closed die position, lift rod 111 is also adjustable in length. Lift rods 112 also may be made adjustable in length as required.

FIG. 17 shows an embodiment of a thermal shaping machine, which is similar to that of FIG. 16. The same reference numerals are used as in FIG. 16 for similar parts. The following modifications exist with respect to FIG. 16:

1. In FIG. 17, the lift adjustment is not made by eccentric pivots as in FIG. 16, but instead by adjustment of a block 113a mounted for slidable displacement along a guide slot 113c in lever 102.

Adjustment of block 113a which is pivotally connected to link rod 110 is achieved by a threaded spindle 113b. The disclosed arrangement of sliding block 113a on lever 102 provides the advantage of a longer adjustment path and also of a more rapid and continuous setting of the lift path. At the dwell state shown in FIG. 24, slot 113c extends along a circular arc about the axis of the stud bearing at 114a which is similar to stud 146, so that the rest state of lifter 109 will remain unaffected by adjustment of block 113a. In order to still further enlarge the range of lift adjustment, the stud bearing 114a in FIG. 17 may also be provided with a sliding adjustment (indicated but not shown), by means of which the spacing Y between stud bearing 114a and axis of shaft 121 may be varied.

Figure 24:
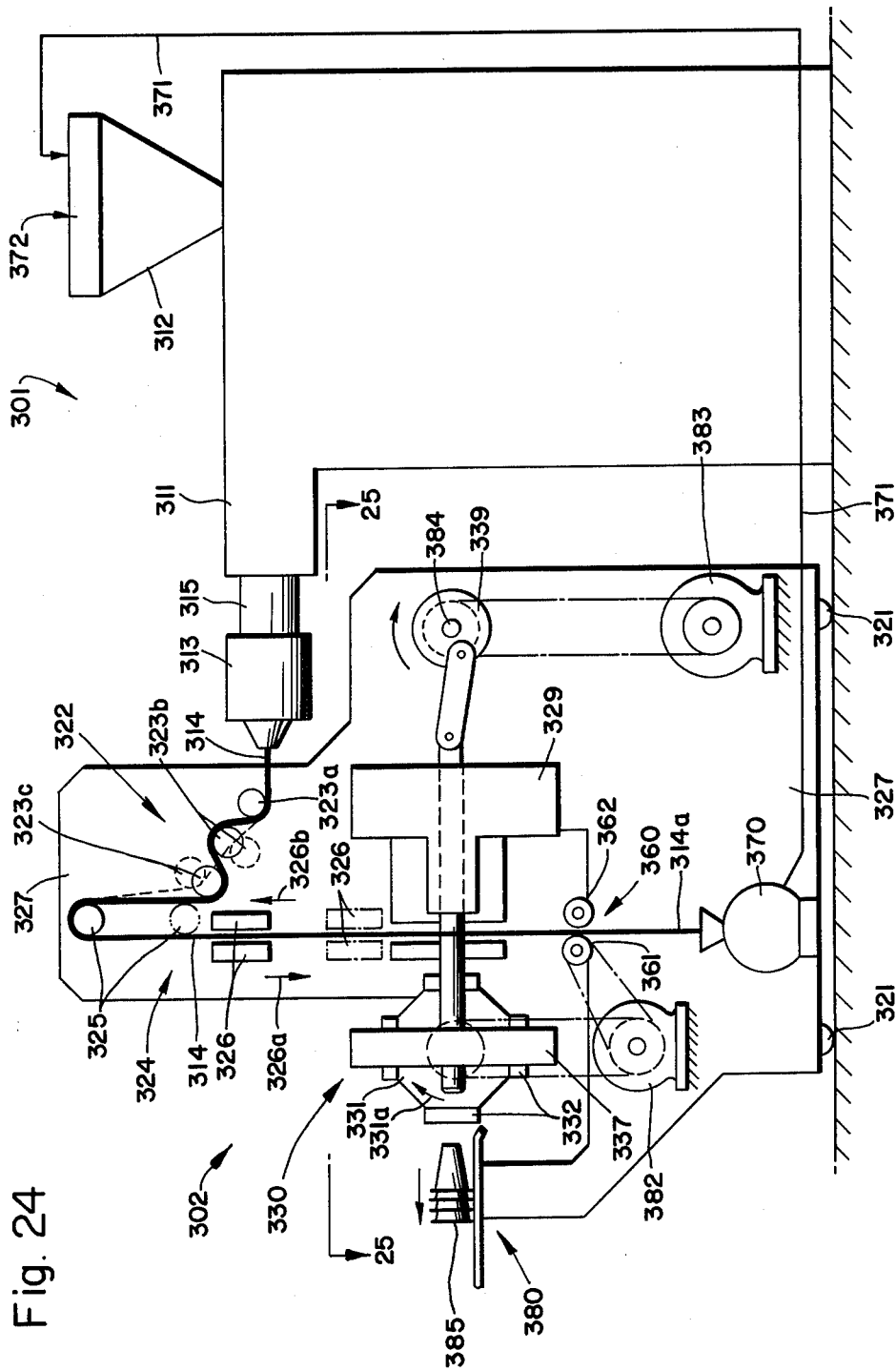
FIG. 24 is a side elevation showing a further embodiment of an apparatus for forming thin-walled articles from thermoplastic material wherein a relatively thick web is initially formed from a source of material.

2. FIG. 17 shows the upper die support 106a with several, for example, three boreholes 125a vertically aligned one above the other. The pivot 125 of lift rod 112 may be placed in any of those holes 125a to locate upper tool 190 at various heights. (FIG. 24 shows a tentering frame as an example of an upper tool 190).

3. The embodiment of a thermal shaping machine shown in FIG. 17 is provided with two pressure cylinders 180, preferably pneumatic, that are double-acting and located at the lower die support 105, and they eliminate conventional ejector springs. Such ejector springs on account of their bulk requirements in the tools, the difficulty in determination their moments of force, their usually constant and uncontrollable pressure and the fact that they require changing for different tools, may be disadvantageous. On the other hand, the double acting pressure-cylinders 180 act as ejectors and peel-off cylinders to provide the advantage of lesser bulk, being mounted outside the tool, and further allowing adjustment to the moment of force required in a particular arrangement. Also, the cylinders need not be replaced for different jobs. The piston rods 181 may be used as automatic ejectors. All operational parts previously located inside a tool employing springs will be on the side of the machine when the double acting cylinders are used, and tool simplification results.

Furthermore, the cylinders may perform various tasks. For instance two cylinders may be used as automatic ejectors when combined with adjustable registers 182 by means of actuating rods 183, while one or two further cylinders are used for forming shallow bottoms as indicated by the actuation plate 185 in the lower part of the die part 186.

Figure 18:
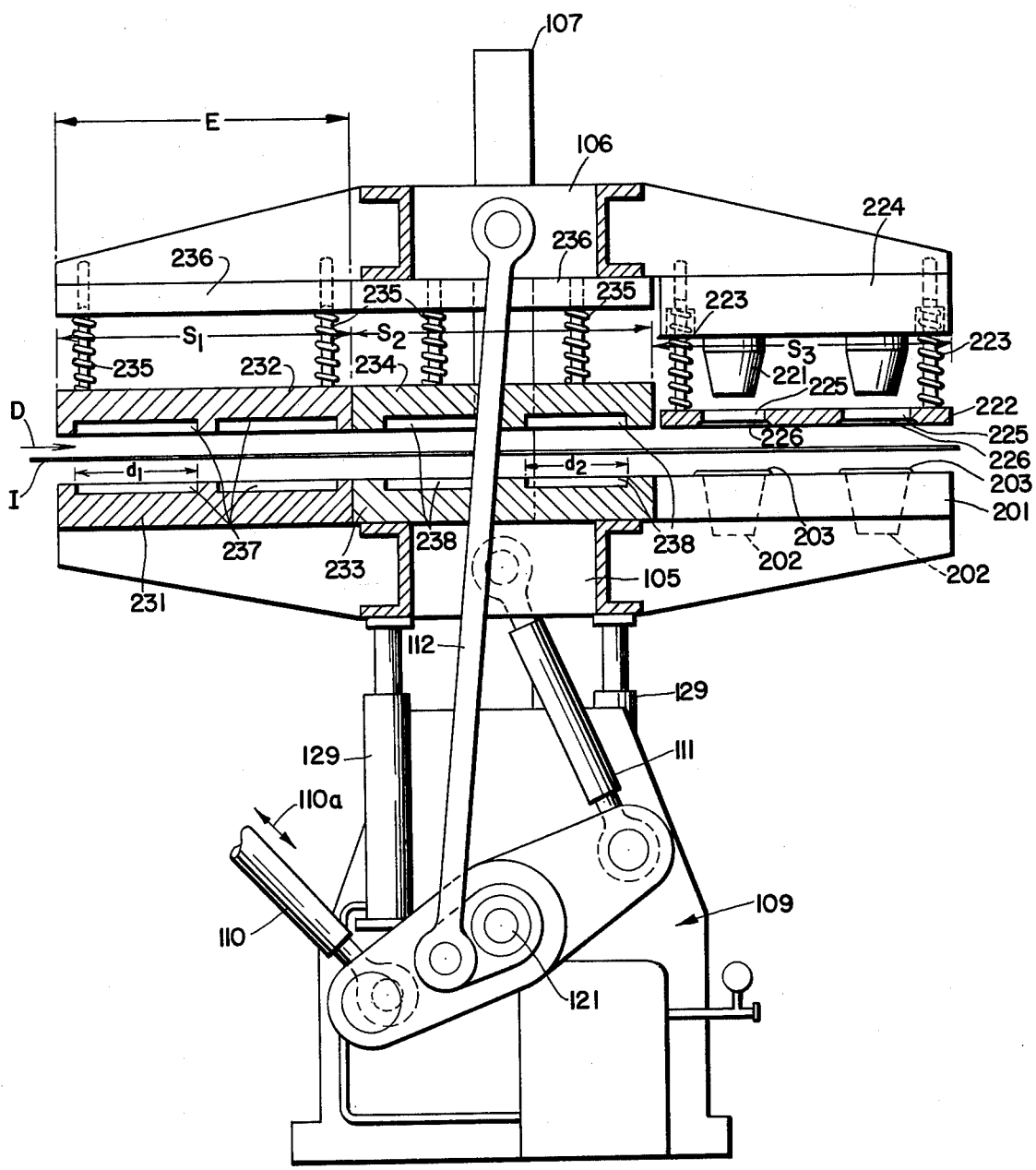
FIG. 18 is a side elevation partly in section showing a thermal forming means to be used in connection with the present invention and containing a two step precooling means.

In further relation to FIGS. 15-17, to prevent the generation of shocks during the vertical motions of die support 105 as well as affecting the relatively soft and sensible web material as acting upon the die parts or auxiliary equipment mounted thereon, and to prevent such shocks from being reflected into the unit 101 and from interfering with the smooth operation of the machine and its drive, a weight compensation or shock absorbing system has been provided which has at least one power-storage element that reaches below the lower die support 105. This weight compensating device comprises at least one compressed fluid cylinder, preferably four compressed air cylinders 126 reaching below the four corner areas of lower die support 105 which are connected in parallel to a compressed air source that may be set for controlled supply or removal and measurement of the pressure to the desired pressurization by means of apparatus. Compressed air cylinders 126 together with the pressurized air source provide a power storage, braking in a definite manner determined by the selected pressure in source, the downward motion of die support 105 while supporting its upward motion, the transmission of damaging shocks thus being prevented. As shown in FIG. 16, the weight compensation device may instead be provided with hydraulic cylinders 129 connected to a hydraulic pressure source container 130 operating in concert with an air cushion. Hydraulic pressure container 130 is also provided with an apparatus 128 for selectively setting the pressure of the shock absorbing cushion. Usually there are only two hydraulic cylinders 129 below the lower die support 105, in diagonal arrangement as indicated in FIG. 18. However, four such cylinders may be provided. It is also conceivable that only one hydraulic or pneumatic cylinder be used, which might be mounted centrally below the lower die support. As shown by FIGS. 15 and 17, the piston rods of the hydraulic or pneumatic cylinders (126,129 respectively) will only engage the lower side of the lower die support 105. One may therefore readily also operate without any weight compensating device by removing the pressures in sources 127 or 130. Also, the pressure in the said sources may be selected so low that there will be some braking and damping action, but that the upward motion of die support 105 will be faster than that of the piston rods so that the upward motion of die support 105 for the purpose of die closing will not be affected by the shock absorbing or damping cylinders. A pressure valve allows operating the apparatus almost weightlessly, that is, for constant pressure applied to the pistons of the compensating cylinder, the same force for the same weight will always be obtained.

As further shown by FIG. 15, a central control device 170 is provided, to which is connected via line 172 a heat-radiation temperature measuring element 171 mounted at dwell station 5. As shown by line 173, which is provided with an arrow, the drive motor (not shown) of gear unit 101 is controlled by the central control device 170. The latter also controls via line 175 the drive device 174 for the adjustment of the second cooling roller 160, as indicated by double arrow 162. It further controls via line 176 the tempering device 177 for the cooling medium. This tempering device 177 is connected in known manner via lines 178a, 178b and 178c with the interiors of cooling rollers 159 and 160 and with free-running cooling roller 161. The tempering device 177 may be constructed and operated in conventional manner in such fashion that rollers 159, 160 and 161 may be maintained at different surface temperatures. Lastly, the central control device 170 also preferably controls the speeds of the drive means and the supply means for plastic extruder 156, neither of which is shown, as indicated by the line 179 with arrow.

The desired normal operating conditions and the desired normal processing surface temperature of web I are set at the central control device 170. As soon as the temperature measuring element 171 senses a surface temperature on web I that exceeds the range of the processing temperature, central control device 170 by means of drive system 174 causes a leftward displacement of the cooling roller 160 in FIG. 15, so that the contact area of web I with cooling rollers 159 and 160 will be increased. If cooling roller 160 during this motion reaches its left-end limit position, the displacement drive device 174 emits a feedback signal to the central control device 170. The latter then automatically causes the temperature of the cooling medium in the tempering device 177 to be lowered for at least one of rollers 159, 160 and 161, for example roller 161, so as to increase the web cooling. However the temperature of the cooling medium in all three rollers may also be decreased simultaneously.

If during such control of the cooling medium temperature a lower predetermined limit of temperature is reached, the tempering apparatus 177 emits a feedback signal to the central control device 170, which then regulates the drive for the cam and gear unit 101 via line 173 and the drive and supply for extruder 156 via line 179 towards greater material transmission and operational speed of the apparatus. If the material of web I so allows, the central control device may further be so adjusted as to decrease the heat output at extruder 156 via line 179 for such a case. If as a result of such control the surface temperature of web I determined by measuring element 171 again decreases, the control sequences indicated will be reversed in opposite sense by the central control device 170, that is, first the ordinary regulation of temperature at extruder 156 and speed of operation at gear unit 101 will be reinstituted, and thereafter the ordinary, preselected control conditions at tempering device 177. If then the surface temperature of web I still remains below the preselected value, drive device 174 for displacing roller 160 will be activated in order to move the roller 160 to the right in FIG. 15 and thereby decrease the contact area between web I and rollers 159 and 160 and lower the cooling rate.

If the surface temperature of web I determined by measuring element 171 falls below the selected value, then the central control device first actuates drive 174 to displace roller 160 until either the desired temperature has been obtained or roller 160 reaches the right-end limit position in FIG. 15. If the latter is the case, drive device 174 emits a feedback signal via line 175 to the central control device 170. The latter then regulates the tempering device 177 in order to raise the temperature of the cooling medium for at least one of the rollers, say roller 160, or for all three 159,160 and 161. If this regulation is insufficient, or if an upper temperature limit of the cooling medium is reached, tempering device 177 will emit a feedback signal via line 176 to the central control device 170. If in that case the surface temperature of web I determined by the measuring element 171 is still too low then the central control device 170 will cause the drive for cam and gear unit 101 and that of the supply mechanism of the extruder 156 to operate at a lower rate, so that the heating equipment of extruder 156 will be more effective with respect to the material output, or else the central control device 170 causes an increase in heat output at extruder 156 via line 179 (if the plastic used allows).

If by these means the temperature of web I is raised into the desired temperature range, then the central control device 170 will first regulate the operating conditions at extruder 156 and at the cam and gear unit 101 so as to revert to the desired normal value. If the temperature of web I still remains at the desired level or is above it, then the central control device 170 will act upon tempering device 177 in order to adjust to the preselected, normal temperature conditions of the cooling medium. Once the latter have been restored, the central control device will activate drive device 174 in order to displace the roller 160 so as to compensate for surface temperature fluctuations on web I.

FIGS. 18–23 show a thermal forming machine provided with a lower die support 105 and an upper die support 106 hereinafter called the 2nd support, which are moved out of phase with respect to each other vertically along guiding columns 107 as by a lifter lever 109 and lift rods 111 and 112. This motion is effected by a drive system similar to that of FIGS. 15–17 moving a link rod 110 in the direction of the double arrow 110a to and fro and thereby inducing lifter lever 109 to oscillate about axis 121. FIG. 18 shows the thermal forming machine when the dies or tools are in the open position, with lower support 105 at the lowest position, and the 2nd support 106 in highest position. The up-and-down motions of the lower die support 105 are damped by weight-compensator 129, so that sudden shocks are avoided.

For the open position of the tools or dies shown in FIG. 18, the web of thermoplastic material I, which is at the forming temperature, is conveyed in one operational step E in the direction of arrow D by a conveying system (not shown) that may be similar to that in FIG. 15.

A cooled thermal die 201 carrying lower precooling tools 231 and 233 is mounted on support 105; these two are connected to a conventional cooling system (not shown) which may be a source of cooling fluid connected to passages in the die or the tools.

Article shaping male form elements 221 project downwardly from the upper or 2nd die support 106. These forms may be mounted by being inserted from above into suitable apertures in thermal die 201. A clamping and stripping frame 222 is associated with thermal die 201 and positioned to be moved onto web I from above. Frame 222 in operation is movable upward against the action of prestressed compression springs 223 toward the lower side of a support plate 224, openings 225 permitting passage of the frame 222 above forms 221.

Further precooling tools referred to as precooling countertools 232 and 234 are suspended from the 2nd support by means of support plates 236, and these tools in operation may be moved upward against the action of the prestressed compression springs 235 as far as the lower side of the support plates 236 on upper die support 106.

Figure 19:
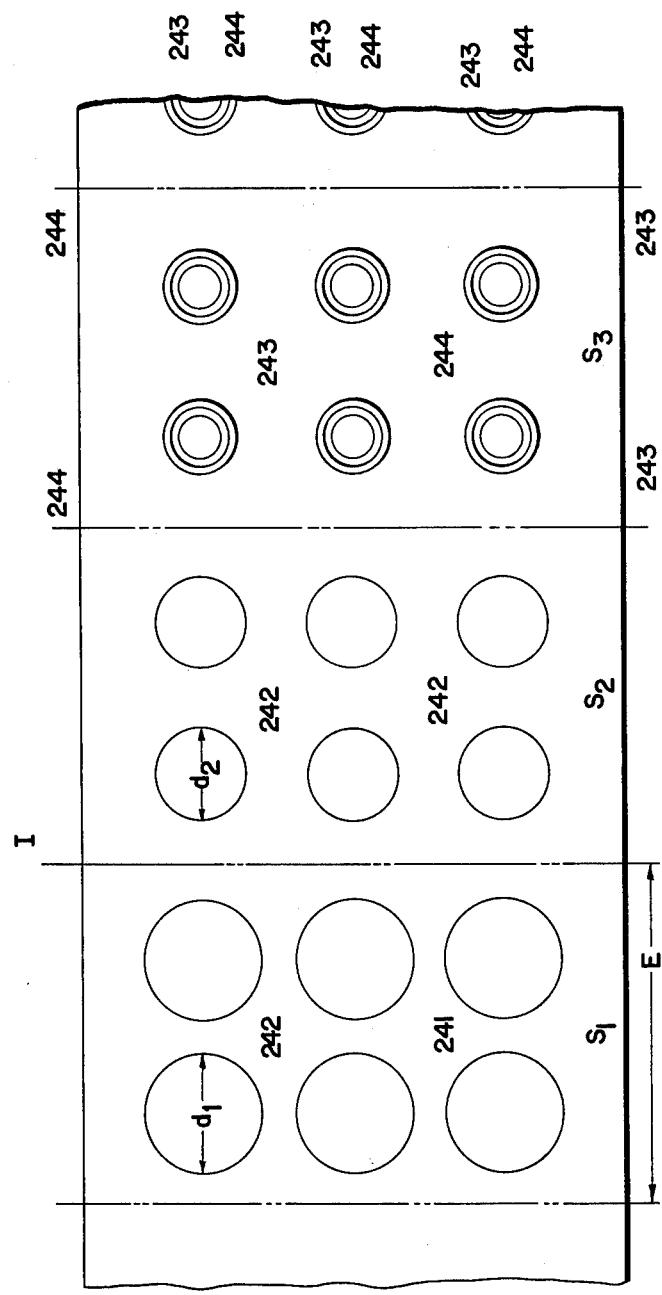
FIG. 19 is a top view of a thermoplastic web treated by thermal forming means according to FIG. 18.

The pair of tool assemblies comprising precooling tool 231 and precooling countertool 232 makes up the first precooling stage and contains circular recesses 237 each having a diameter $d_1$ which, as shown in FIG. 19, results in defining circular areas 241 in web I that are kept free from precooling and are appreciably of larger diameter than the definitively shaped regions of thermal die 201.

The pair of tools comprising precooling tool 233 and precooling-countertool 234 forms the second precooling stage and contains circular recesses 238 in an arrangement similar to the first stage and of diameter $d_2$ appreciably smaller than $d_1$ but preserving circular areas 242 in web I that are free from precooling and still appreciably larger than the areas in web I to be thermally shaped.

The bottom face of frame 222 together with the upper face of thermal forming die 201 forms the third cooling stage for the residual material in the web. The third cooling stage is substantially concurrent with the thermal forming stage. Frame 222 is a plate provided with apertures 225 for passage of the upper shaping forms 221 and the lower end of passages 225 are countersunk at 226 to cooperate with an annular, upward projecting die rib projection 203 adapted to form the rim 243 (FIG. 19) of the shaped article. The actual cup-like shaped article 244 is formed in the web by the descending forms 221 entering the correspondingly shaped female form recesses in the lower die support and drawing the web material to the desired shape.

Each length of the advance E of the web is equal to the length of the successive stages of thermal die 201 in the same direction as regards the precooling tools 231,233 and the precooling-countertools 232 and 234.

When the lower die support 105 is lifted and the 2nd support is lowered in operation, the precooling tools 231 and 233 as well as the face of thermal die 201 will be applied from below against web I, while the precooling countertools 232 and 234 as well as frame 222 are lowered from above against web I. When further bringing together die support 105 and the second support 106, springs 235 and 223 will become stressed, so that the precooling tools 231 and 233 as well as the precooling countertools 232 and 234 will be urged under predetermined pressures against the surface of web I. In the process, the above described area wise precooling of web I occurs simultaneously in both the first and second precooling stages. Simultaneously, there also takes place, during the thermal shaping process in the non-precooled areas of web I due to the cooperation of thermal die 201 with frame 222 and forms 221, cooling in the third stage.

The apparatus after completion the shaping stroke is then moved back into the open position of FIG. 18. The shaped articles in the web are lifted from the recesses 202 during this motion and web I is then advanced by one forward step a distance E in the sense of arrow D. In this manner, a new web section reaches the first precooling stage, the precooled section from the first stage reaches the second precooling stage, and the section from the second precooling stage reaches the combined thermal shaping and third cooling stage. The recesses 237 of the first pre-forming stage, the recesses 238 of the second pre-forming stage and forming recesses 202 are so arranged and the web movement is such that the non-precooled web areas 241 and the non-precooled web areas 242 of the second precooling stage respectively arrive in alignment with the recesses 238 and the shaping recesses 202. The length of each of the foregoing stages $S_1$, $S_2$ and $S_3$ is preferably equal to the distance E.

Thus, each time the upper and lower die supports are brought toward each other by rocking of lever 109, assuming that a length of heated web I equal to three times the distance E is disposed between the tools, at first stage $S_1$ the section of the web pressed between tools 231 and 232 is precooled except at areas 241 of FIG. 19; at second stage $S_2$ the section of the web pressed between tools 234 and 235 is further precooled except at areas 242 of FIG. 19, and at stage $S_3$ the articles are thermally formed in the stabilized web by the action of projecting forms 221 entering recesses forms 202 and at the same time the web surfaces around the formed areas 243,244 of FIG. 19 are further cooled by engagement of the opposite surfaces of the web with surfaces of die 201 and frame 222. Each time the dies are separated, there is an intermittent advance of the web I for the distance E before the next cooling and shaping stroke.

Since the upper tools 232 and 234 and the frame 222 are separately resiliently mounted on the upper die support their engagement pressures with the web I are substantially uniform and resiliently applied and maintained. When projecting forms 221 are performing the shaping operation they are acting upon a web section in stage $S_3$ that is resiliently gripped and held flat between plate 222 and the lower die, so that smooth accurate shaping is effected. When the dies separate and forms 221 move upwardly frame 222 acts a stripper plate to help separate the web from the shaping forms.

Somewhat modified tools or dies are illustrated as mounted on the lower tool support 105 and on the 2nd support 106 in the example of FIGS. 20–23. All parts similar to those of FIGS. 18 and 19 have the same reference numerals. The recesses 255 in the precooling tool 251 no longer are surrounded by cooling fields, but rather by cooling-and-shaping fins 256 cooperating with similar cooling-and-shaping fins 257 of the associated precooling countertool 252. Fins 256 and 257 are peripherally continuous and although shown as rectangular may be any outline. The fins have countersunk mating regions around their peripheries. In this manner, grid-like ribs 245 are formed in web I at the first precooling stage, while the intervening and rectangular or roughly square areas 246 of the example shown remain uncooled. Precooling tool 253 and precoooling countertool 254 in the second stage are provided with recesses 258 at the second precooling stage, and these recesses are surrounded with oppositely contoured precooling-and-shaping fins 259. In this manner, there is formed within ribs 245 a second oppositely shaped rib arranged 247 surrounding uncooled areas 248 in FIGS. 22 and 23.

Figure 20:
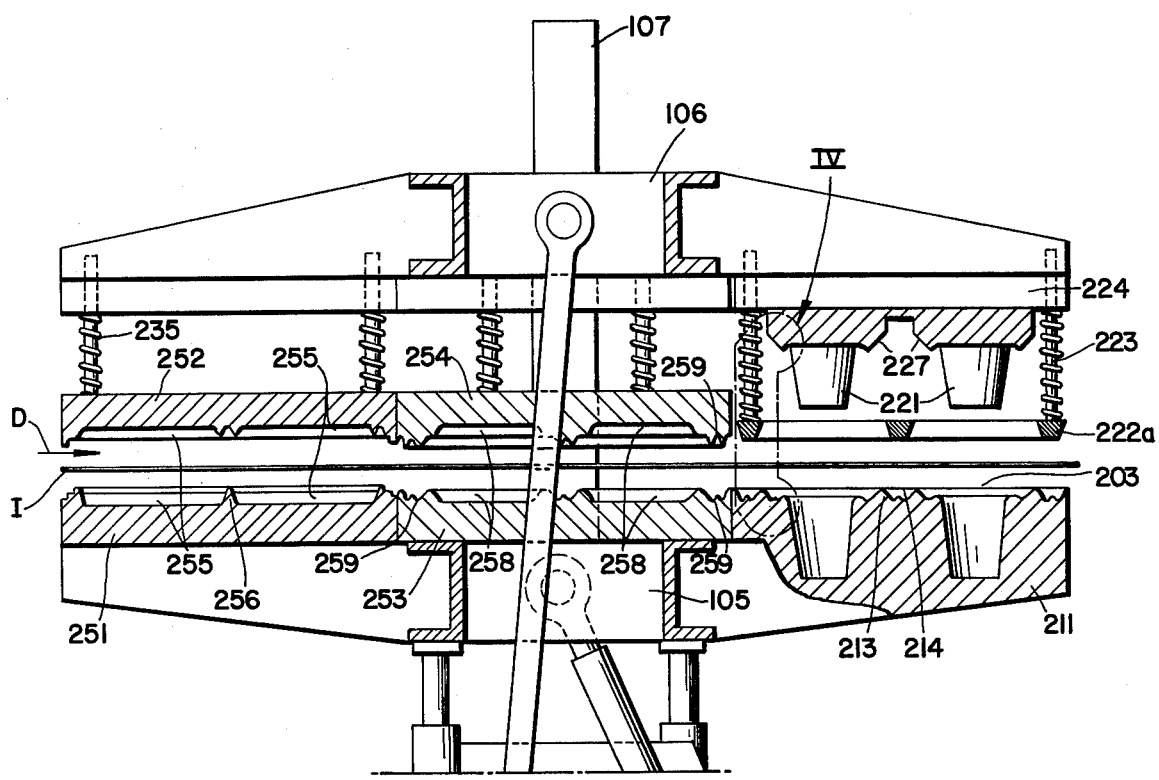
FIG. 20 is a partly cut away side elevation partly in section showing a thermal forming means that is a variation of that of FIG. 18.
Figure 21:
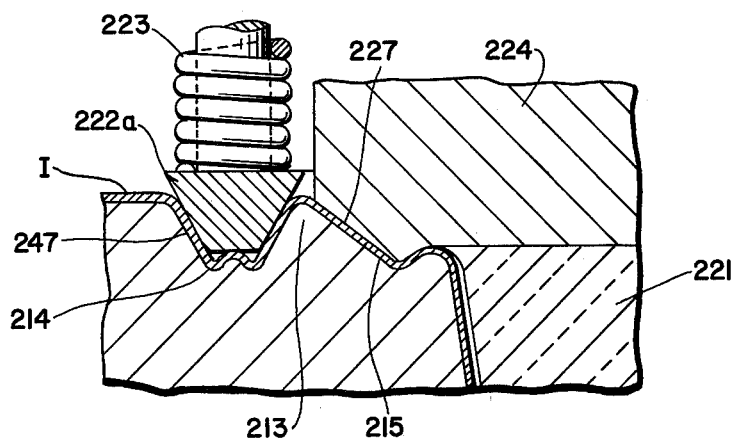
FIG. 21 is a side elevation partly in section and partly cut away showing a detail of the apparatus of FIG. 20 in closed position.
Figure 22:
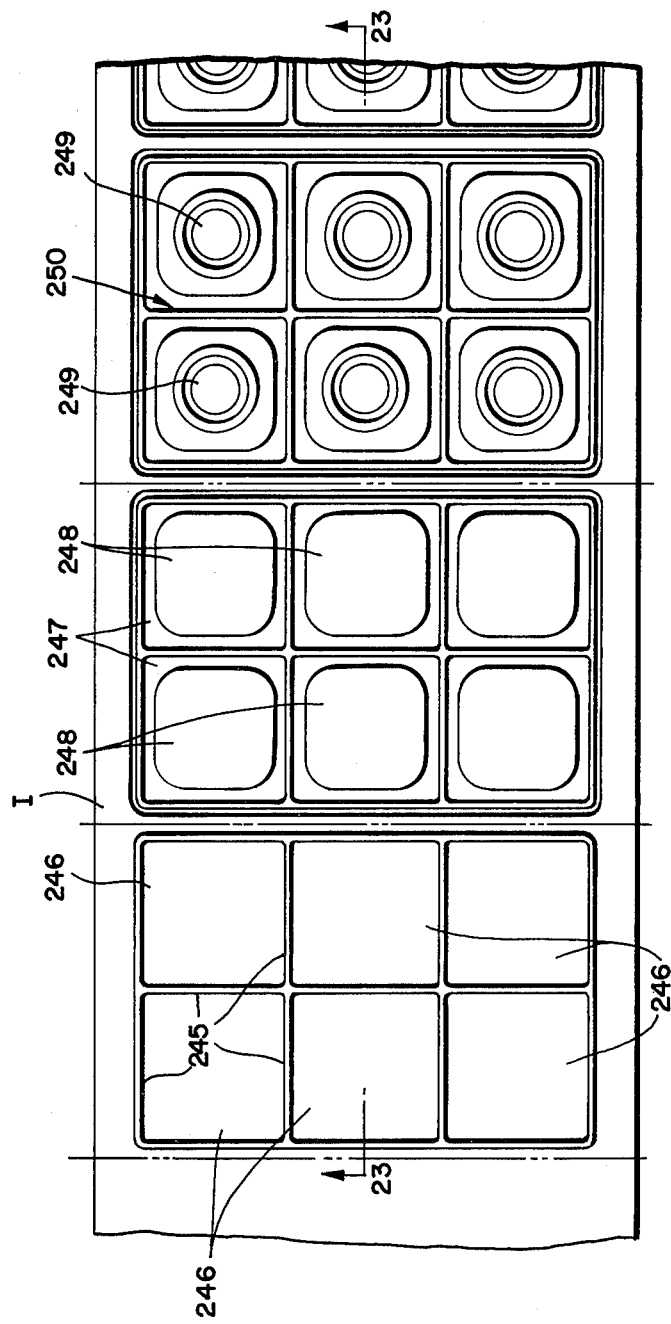
FIG. 22 is a top view of a thermoplastic web treated by the thermal forming means of FIGS. 20 and 21.
Figure 23:
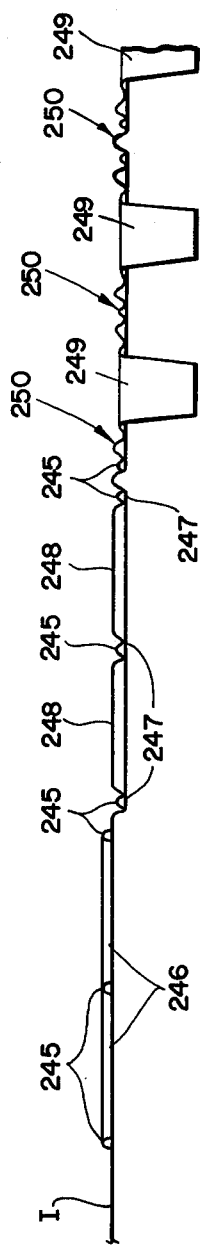
FIG. 23 is a sectional view along line 23—23 of FIG. 22.

Lower thermal die 211 in the third stage of FIG. 20 is also modified at its upper face. Shaping die ribs 203 at each recess are provided therearound with additional external ring-like forming bulges which may be square with rounded-off corners 213 with grooves 214 (see FIG. 21) for receiving the ribs 247 shaped into web I. As shown in FIG. 21, the cooling and stripper frame 222a may be so constructed that it penetrates grooves 214 so that the open side of the ribs 247 is thereby formed into web I. There are inclined forming surfaces 215 extending from the peripheral corners 213 to the shaping ribs 203, and these are matched by corresponding countershaping areas 227 on the support 227 for shaping forms 221, as shown in FIG. 21.

This structure of the thermal die (FIGS. 22,23) allows shaping a wavelike rib structure 250 surrounding each shaped article area 249 during the precooling stages and the thermal forming stage in the residual web material, so that the residual material is subjected to a more intense cooling and desirably becomes a stiffened, frame-like structure which may be efficiently transported to and accurately centered in an adjoining stamping station.

Figure 25:
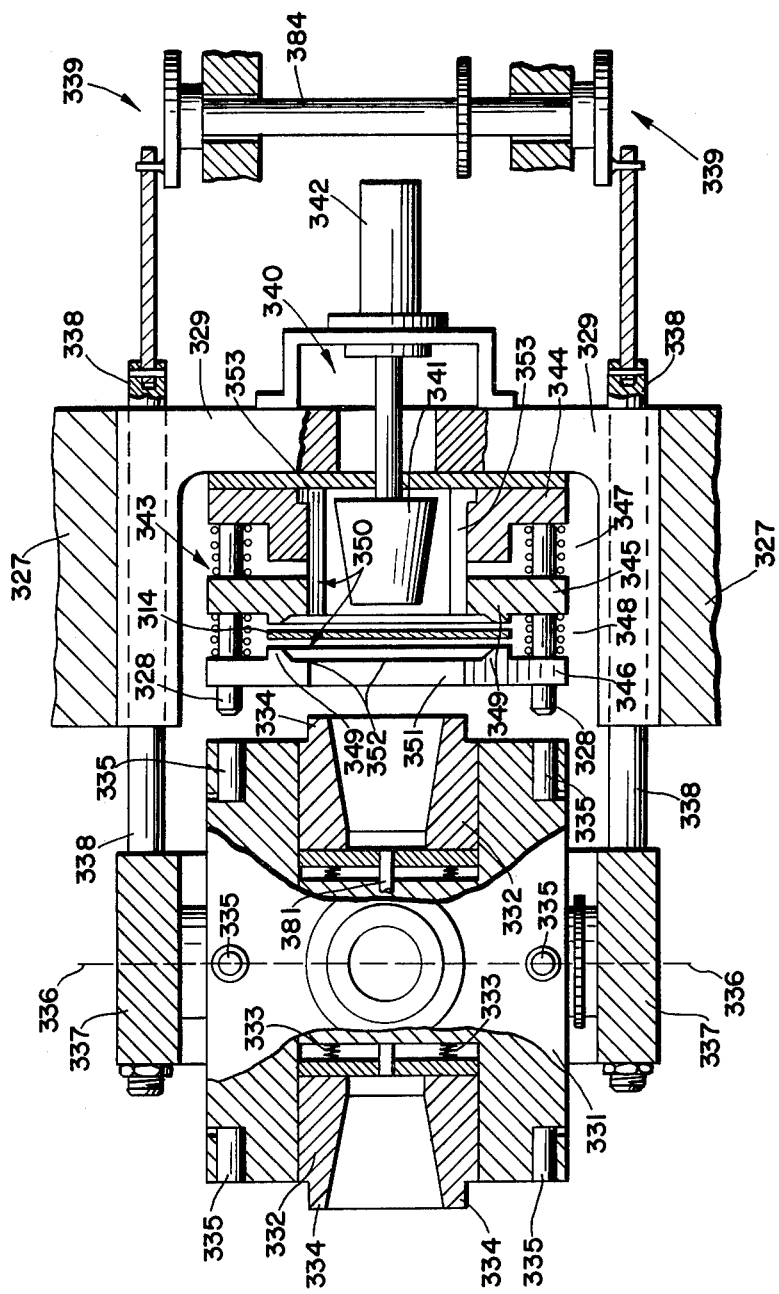
FIG. 25 is a sectional view substantially along the line 25—25 of FIG. 24.

In FIGS. 24 and 25 the apparatus consists of two units, namely a web manufacturing unit 301 and a web processing unit 302. The former comprises an extruder 311, which for example may be a worm extruder fed at its hopper 312 with fine, preferably granulated thermoplastics. A web-forming nozzle 313 at the extruder outlet receives the thermoplastic which has been softened by the heat and pressure applied in extruder 311 and produces continuously a web 314 that is essentially at the extrusion temperature when entering unit 302.

The web manufacturing unit 301 shown in its simplest constructional form in FIG. 24 may be additionally provided with extruders for different kinds of thermoplastics also fed to nozzle 313 and connected to the neck 315 mounted between extruder 311 and nozzle 313 as previously described herein. A web 314 may be manufactured in this manner that consists of two or more layers of different thermoplastics or of differently pretreated materials, for example differently dyed. One may also make a web in such manner that is coated on one or both surfaces with a thin plastic, for example anti-electrostatic in nature. One may also coat the web with one or two surface layers of a material different from that of the main web, for example using impact-proof polystyrene for the web material proper while one or both surfaces will be coated with a polycarbonate-based plastic.

The web manufactured by the unit 301 may be of relatively large thickness within the scope of the invention, for instance 3mm or more. This however does not exclude the feasibility of manufacturing and processing thinner webs, for instance from 0.5 to 2.0mm thick, by means of the process and apparatus shown.

The web 314 delivered by unit 301 reaches a stabilizing-and-cooling device 322 mounted at the inlet of web processing unit 302 while still essentially at the extrusion temperature. The distance between nozzle 313 and the inlet to the stabilizing and cooling device 322 may be adjustably adapted to the particular requirements, for example the entire web processing unit 302 being movable by means of wheels or rollers 321.

Stabilizing and cooling device 322 may be provided with three cooling rollers 323a, 323b and 323c. As indicated in dashed lines, cooling rollers 323b and 323c may be adjusted transversely of the conveying movement of the web 314, in order to vary the looping angle and areas that web 314 passes in heat conducting contact over the cooling rollers. However, as in the earlier embodiments, the stabilizing and cooling device 322 cools only a thin outer range of web 314, and stiffens the web only slightly, while the material inside these surfaces of stabilized web 314 essentially remains at the extrusion temperature and in the plastic state.

Web 314 passes from the stabilizing and cooling device 322 to equipment 324 which feeds the web to the thermal shaping device, vertically and intermittently from top to bottom, and consists essentially of a compensating roller 325 and a gripper system 326 which is suitably cooled and intermittently moved up and down between the upper position shown in full lines the lower one in dashed lines.

The gripper system 326 may be such that it engages web 314 only along strip like elements on gripping rails to minimize surface contact. It is so positioned with respect to the thermal shaping device that those parts of web 314 engaged by the strip-like elements and hence cooled by them are in the residual web 314a, that is, they lie between the web areas that are to be shaped by the thermal forming device. The illustrated gripper system consists of two parts which receive the web 314 between them. They are pressed against each other to grip the web when the gripper system moves downward, while during the upward motion they are held spaced apart and hence do not touch or move web 314.

The compensating roller 325 and the gripper system 326 are synchronously controlled for the up-and-down motions, the upward motion of the compensating roller taking place continuously at half the incoming speed of web 314 which is also continuous. The downward motion of the compensating roller occurs simultaneously with that of the gripper system and in steps that correspond to the length of the web section which is to be processed during each interval at the thermal forming station 330.

The thermal shaping station 330 is preferably mounted underneath gripper system 326, so that it receives the web in intermittently advanced vertical steps and web feed is aided by gravity. This thermal shaping station 330 is characterized by a system of dies or tools and their accessories, wherein the die to which the web is to be fed is located for horizontal displacement opposite the web. The thermal shaping station 330 further comprises means for separating the shaped articles from the web.

As shown in FIGS. 24 and 25, the thermal shaping station 330 comprises a die support 331 which may rotate about a horizontal axis, and it contains four spaced independent tools 332 that are 90° apart from each other. For the sake of simplicity, the drawing shows only single tools 332, but practically these will be multiple tools in order to produce a plurality of shaped articles during each single sequence of operation at the thermal shaping station.

As shown in FIG. 25, each of the four tools 332 is recessed to receive a forming element is radially slidably supported in the die support 331 so as to be displaceable against the action of springs 333. The rotational axis of support 331 is indicated at 336. Devices (not shown) may be mounted at the center of the die support 331 which will retain die 332 in a retracted position, for a predetermined time, for example until the shaped article is ejected, at least until die support 331 has reached its initial horizontal position. This avoids pushing back the shaped articles toward the residual web after termination of the shaping and stamping process.

In the rest position shown in FIG. 25, each of the recessed form tools 332 projects from the particular side face of die support 331 by the distance its rim 334 surrounding the tool recess. Two guide bores 335 are provided in the die support 331 at each side face of the particular die 332 by means of which die support 331 in its motion toward the web will slide upon centering or pilot rods 328 mounted above the machine frame 327 of the web processing unit 302. The horizontal pivot containing axis 336 of die support 331 is parallel to the vertically disposed web 314 and mounted on a guiding frame 337. Frame 337 is horizontally slidably mounted by two guide rods 338 connected to a crank assembly 339 that operates to effect a horizontal to-and-fro motion of die support 331 with respect to the web. Alternately, guide rods 338 may also be moved to and fro as by correspondingly controlled pressure cylinders. Both guide rods 338 are slidably supported along their horizontal longitudinal axes, which are at right angles to the surface of web 314, in a slide guide member 329 mounted on the machine frame 327, and member 329 also supporting the centering rods 328 which are parallel to guide rods 338.

The accessories of the tools and the separation system are mounted on the guide member 329, and one structure is provided in common for operation with each of all four tools 332 as they act on the web. A forming system 340 is mounted on guide member 329 to that end, consisting of a projecting form element 341 shaped correspondingly to recessed tool 332, or a forming system adapted to multiple tools and a pressure cylinder 342 is connected for selectively horizontally displacing the form element 341 into the oppositely positioned tool recess.

A holding and stripper assembly 343 composed of three plates and operating on web 314 is mounted on the centering rods 328. Assembly 343 comprises a gear stop plate 344, a center plate 345 and a front plate 346 facing the support 331. The rear stop plate 344 is mounted on guide member 329, whereas the center and front plates 345 and 346 are slidable along the centering rods 328. The three plates 344, 345 and 346 are biased spaced apart by compression springs 347 disposed between rear stop plate 344 and center plate 345 and by compression springs 348 also mounted on centering rods 328 and disposed between the center and front plates 345 and 346. However these plates will be pushed toward each other against the action of springs 347 and 348 when the die support 331 approaches and engages in operation, and thereby be strongly compressed while resiliently clamping web 314 under pressure, so that the die support in moving over centering rods 328 will abut the adjacent end face of tool 332 against the front plate 346. The center and front stretching frame plates 345 and 346 are provided with oppositely located tensioning rails 349 engaging web 314 in operation.

The front plate 346 is provided with an aperture 351 for the formation of a separation system 350, and aperture 351 receives with play the projecting opening rim 334 of advancing tool 332. The rear peripheral rim 352 of this opening 351 acts as a cutting edge. The counter-element cooperating with this cutting edge 352 is a stamping knife 353 on rear stop plate 344 into which the shaped part of the web is displaced by form element 341.

At the end of the article forming operation wherein the tool 332 is horizontally engaged with the assembly 343 and form 341 is advanced to draw the web material into the recess of tool 332, the die support 331 ismoved away from assembly 343 and at the same time form 341 is retracted to the FIG. 25 position, leaving the formed article, or articles, in the recessed tool 332. The residual web is then moved downward.

A removal device 360 for the residual web 341a is mounted below the actual thermal shaping device 330, and in the example shown this consists of an intermittently driven removal roller 361 and counter roller 362. The residual web is led from this removal system 360 to the size-reducing device 370 shown schematically in FIG. 29 and mounted on the web processing unit 302. The residual web may thus be reconverted into granular material in unit 370 and then immediately fed back to the extruder hopper 312 in the system as indicated by line 371. As shown by arrow 372, the feedback material may be mixed with fresh material in the hopper. However, one may also store the granulated material and make use of it only later.

As shown in FIG. 24, devices 380 for catching and removing shaped articles ejected from tools 332 when they reach the position 180° from the forming position are mounted at the side of die support 331 opposite web 314. The ejection of the shaped articles is effected by vacuum and compressed air lines 381 opening into the cavities in dies 332, and these lines are connected via valves controlled from the central machine control to suitable vacuum and compressed air sources. The periodic rotation of die support 331 and of removal roller 361 is preferably effected by an electrical motor 382 periodically energized from the central machine control. The drive of crank drive is effected by an electrical motor 383, which may also operate periodically and be controlled from the central machine control. Preferably however, a continuously operating drive motor 383 will be used, and the central control for the continuously or periodically operating devices of the web processing unit 302 will be connected to shaft 384 of the crank drive 339. By controlling the speed of drive motor 383, one may regulate over a sufficiently wide range the operational rate or output of the web processing unit 302 so as to adapt it to the output of extruder 311 and nozzle 313. Further, extruder 311 may be controlled in known manner with respect to its own output.

The operation of the foregoing system is as follows:

Web 314 issuing from nozzle 313 enters the stabilizing and cooling device 322. By proper setting of the cooling rollers 323b and 323c, the first processing step of the invention is executed, namely a stabilizing surface temperature is provided for the hot plastic web 314 coming from nozzle 313, which temperature is low enough to stabilize the surfaces of that web, so that the continuously incoming web may be intermittently moved through the thermal forming machine. Web 314 is fed continuously from the stabilizing and cooling device 322 to the compensating rollers 325, which converts continuous web motion to intermittent downward vertical motion, the synchronism and the length of such intermittent motion being determined by the central control system. The compensating roller 325 is supported by the gripper system 326. When the thermal shaping device 331 is in the open position shown in FIG. 25 and therefore with the plates of frame 343 biased to open condition by springs 347 and 348, compensating roller 325 and the gripper system 326 will be driven downward in the sense of the solid arrow 326a, both parts of the gripper system 326 being pressed toward each other to resiliently clamp the web between them. The length of such discrete motion may be adjusted to the vertical length of the web section gripped by clamping ribs 349 on frame 343, plus a minor length of web which is touched by upper and lower transverse ribs on gripper system 326. The compensating roller 325 again moves from its lower position, showed in dash lines, towards its upper position in a loop forming function during the continuous feeding of web 314. The parts of the gripper system 326 will be separated from one another and from web 314 after reaching the lower position and then moved back upward according to dashed arrow 326b into the initial position.

Motor 383 also is switched ON by the central control system during the downward web advance step. Thereby, the residual section of web in the thermal forming station is removed simultaneously with the feeding of a new section into the thermal forming station 330. Also, die support 331 is rotated by 90° in the sense of arrow 331a, so that the next tool 332 moved into position now faces a new section of web 314. The central control system may be so connected with shaft 384 of the crank drive 339 that shortly after termination of the web advance step, crank drive 339 will move the die support 331 into contact with the front plate 346. The rim 334 of die 332 will then extend into the aperture 351 of the front plate 346. The thickness of latter inside the clamping rib 349 is equal to the height of the aperture rim 334, so that the front face of the die 332 will lie in the plane of the rear area of the front plate 346 and within the clamping rib.

Springs 348 being considerably weaker than springs 347, the front frame plate 346 at first will be urged against the center plate 345 while clamping web 314. At this moment, the central control system energizes the pressure cylinder 342 of form element 341 for the initiation of the actual thermal forming process, so that the element 341 pushes the central region of the clamped area to be shaped of web 314 into the hollow space of die 332. Upon further rotation of crank drive 339, both plates 345 and 346 will be advanced along rods 328, compressing springs 347, until the center plate 345 abuts stop plate 344. During this motion, first the front face of the stamping knife 353 will contact web 314 which already has been subjected to shaping by form element 341. Subsequently the front face of the opening rim 334 presses the web in the area surrounding the shaped article against the front face of the stamping knife 353, so that the space surrounding the latter is sealed at the side toward web 314. If form element 341 is being moved toward the web at this time the pressure of compressed air generated in the sealed region together with the vacuum applied to supply lines 381 in the die suppot 331 will combine with the forming action of the tool to effect complete forming of the shaped articles in the web.

The mutual front-face bracing of die 332 and stamping knife 353 takes place before the center plate 345 contacts stop plate 344. Therefore, during the further motion of die support 331 toward web 314 by crank drive 339, die 332 will be displaced into the interior of die support 331 against the action of springs 333, stamping knife 353 passing into recess 351 of the front frame plate 346 and separating the shaping article from the web along the cutting edge 352. Despite such separation, the above described complete shaping process by the action of the compressed air continues as long as die 332 and stamping knife 353 mutually brace each other while clamping the rim of the shaped articles, and also still during the first part of the horizontal return motion of the die support 331. The vacuum applied to the supply line 381 in each case will remain in the state shown in FIG. 25 even after the return motion of die support 331.

Once the tool support 331 has been moved away from the web at least so far that the bores 335 leave centering rods 328, and after the opening rim 334 of the die 332 has left the recess 331 of the front frame plate 346, the next advance step for web 341 may be initiated by the central control system. As explained above, the die carrier 331 will be rotated by 90° clockwise in FIG. 24, so that the previously upward pointing tool 332 now will face web 341. The supply line 381 still remains connected to the vacuum, so that the separated shaped article received by the tool 332 remains in the tool after completion of the thermal forming operation and will be cooled therein. After termination of the next thermal forming operation when the die support 331 has been rotated by 180° from the article forming position, the supply line 381 is disconnected from the vacuum source and is connected thereafter to a compressed air source so that the cooled shaped article may be ejected by air pressure from die 332 and transferred to the receiving and removing device 380. Any suitable arrangement for selectively connecting the different lines 381 to sources of vacuum and air pressure depending on the rotated position of support 331 may be provided. In any event vacuum is applied into the bottom of the cavity of the tool 332 facing the web, and air pressure for ejecting the article is supplied into the bottom of the cavity but is 180° away from the forming position.

Modifications of the above may be undertaken. For instance the die support 331 might be carried during the described intermittent rotation by the machine frame 327, while the guide member 329 may be moved horizontally to and fro together with the parts of the thermal shaping device and the separation system 350 mounted on it, by means of crank drive 339.

If desired, the cooling period of the shaped articles 385 in the die 352 may be increased by intermittently rotating the die carrier 331 in an opposite direction from that indicated by arrow 331a and by mounting the receiving and removing device 380 for shaped articles 385 beneath die support 331. The shaped articles in such a case would be cooled for the additional time of two consecutive thermal shaping operations. Conceivably, die support 331 may be provided with more than four tools 332 and with correspondingly more angular tool operating positions. On the other hand, it is entirely conceivable that the die support 331 be equipped with fewer, for instance with two or three tools 332 or multiple tools, and that there be fewer such angular positions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of manufacturing thin-walled synthetic plastic articles which comprises the sequential steps of (2) extruding a continuous web of hot thermoplastic material at a relatively high temperature in the upper limits of the range wherein said material is in substantially fluid but extrudable plastic condition, (2) substantially immediately rapidly precooling the opposite surfaces of said web to form along said surfaces thin supportive layers having a temperature in the range wherein said material is substantially solid and not elastically deformable while the hotter core material between said layers remains in substantially fluid condition, (3) allowing said layers to be partially reheated by heat conducted from the core whereby the temperature at said layers is such that the material is said layers achieves an elastically deformable condition, and (4) then thermally forming said web to an article of desired shape.

2. The method defined in claim 1, wherein the web is subjected to a forming tool operation wherein the respective layers are deformed and or displaced relatively according to one or more shaped tool surfaces acting thereon and the still hot fluid core material distributes itself in accord with tool pressures to occupy the space between said layers.

3. A method of manufacturing thin-walled synthetic plastic articles which comprises the sequential steps of extruding a continuous hot plastic web of thermoplastic material at a temperature wherein said material is in substantially fluid condition and substantially immediately stabilizing said web by passing the opposite surfaces of said web in contact with heat exchange areas maintained at substantially constant cooling temperature materially below the extrusion temperature and below the temperature range in which said material is elastically deformable for precooling opposite surfaces of the web to provide therealong continuous relatively thin outer supportive layers while the core remains in hot fluid condition, allowing said outer layers to be partially reheated by heat conducted from the core so that said layers become sufficiently elastic and deformable to permit shaping, and subsequently subjecting said web to a shaping tool operation wherein said layers are positively displaced relative to each other while the hot plastic material between said layers remain sufficiently fluid for redistribution between said layers.

4. The method defined in claim 3, wherein during said shaping tool operation said layers are shaped substantially by stretching and at least one of the layers is further cooled by contact with a shaping tool surface.

5. The method defined in claim 3 wherein during said shaping tool operation corresponding opposite portions of said outer web layers are relatively displaced substantially in their respective planes, as permitted by the relatively fluid plastic material therebetween.

6. The method defined in claim 3 wherein the hot plastic material between said layers remains at substantially extrusion temperature during web stabilization.

7. The method defined in claim 3 wherein the material is polystyrene, the extrusion temperatures are in the range of 200°–220° C, and the web entering the shaping tool operation has a core temperature in the range of 140°–170° C and an outer layer temperature in the range of 115°–140° C, a minimum difference of about 25° C being maintained within the range.

8. The method defined in claim 3, wherein the material is substantially equal parts of polyestyrene and high impact polystyrol, the extrusion temperatures are in the range of 200°14 220° C, and the web entering the shaping tool operation has a core temperature in the range of 140°–170° C and an outer layer temperature in the range of 115°–140° C, a minimum difference of about 25° C being maintained within the range.

9. The method defined in claim 3, wherein temperature distribution during reheating is effected by proportional reflection of radiant heat from the hot plastic web.

10. The method defined in claim 3, wherein air at controlled temperature is circulated over the layer surfaces at said areas for effecting temperature distribution during reheating.

11. The method defined in claim 3, wherein said web consists essentially of a single extruded web component.

12. The method defined in claim 3, wherein said web is a composite that consists essentially of at least two extruded web components of thermoplastic material superposed in the hot plastic state, and said supportive layers are formed on the two outermost surfaces thereof.

13. The method defined in claim 12, wherein said composite web is formed by superposing hot plastic web components of a first material upon opposite sides of a hot plastic web component of a core material, and said supportive layers are formed on the outer surfaces of said first material components.

14. The method defined in claim 12, wherein said composite web is formed of extruded web components of different thermoplastic materials.

15. The method defined in claim 12, wherein one of said web components is a standard polystyrene and a superposed component is an impact resistant polystyrene reacted with butadiene-rubber.

16. The method defined in claim 15, wherein said web components are extruded at temperatures of about 170°– ° C and said surface layers are cooled to a temperature within the range of about 130°–140° C.

17. The method defined in claim 14, characterized in that the thermoplastic material of one web component is polystyrene or polystyrene reacted with butadiene-rubber, and that the thermoplastic material of the other web component is a polyolefin, for example polypropylene or polyethylene.

18. The method defined in claim 14, characterized in that the thermoplastic material of one web component is a polystyrene or a polystyrene reacted with butadiene-rubber and that the thermoplastic material of the other web component is a polycarbonate.

19. The method defined in claim 13, characterized in that the thermoplastic material of the core component is polyalpha-methyl-styrene while the outer web components are of polystyrene or a polystyrene reacted with butadiene-rubber.

20. A method as defined in claim 3, including the step of precooling the stabilized web prior to the shaping operation outside the areas that are to be shaped into articles.

21. A method as defined in claim 20, wherein the web is intermittently advanced to subject sections of predetermined length successively to precooling and shaping operations in snychronism.

22. The method defined in claim 21, wherein said precooled web is intermittently advanced to subject each said web section to two successive stages of precooling prior to shaping.

23. A method as defined in claim 22 wherein in each succeeding precooling stage, smaller areas move closely approximating the areas to those to be formed into articles are not subjected to precooling.

24. A method as defined in claim 20, characterized in that precooling is sufficient to provide a framelike stiffening structure in those parts of the web not to be shaped into articles.

25. A method as defined in claim 3, wherein (a) the stabilized web at the shaping temperature is passed through a thermal forming station in an essentially vertical direction and the shaped articles are formed out of the web in an essentially horizontal direction; and (b) the shaped articles are separated from the web simultaneously with thermal shaping and are cooled further for a predetermined period after separation from the web.

26. A method as defined in claim 25, characterized in that the web is intermittently moved longitudinally downwardly through the forming station.

27. A method as defined in claim 25, characterized in that the web is precooled in the areas outside those to be shaped and prior to thermal forming.

28. A method as defined in claim 25, characterized in that the shaped articles are post-cooled in cooled shaping tools.

29. A method of manufacturing thin-walled synthetic plastic articles which comprises the sequential steps of forming as by extrusion a continuous hot plastic web of substantially fluid thermoplastic material and substantially immediately stabilizing said web by contacting opposite surfaces of the web with heat exchange surfaces maintained at a predetermined cooling temperature appreciably lower than the forming temperature to initially provide along the said web continuous cooled outer supportive layers that are not sufficiently deformable to permit their shaping in a subsequent shaping tool operation while the hot plastic material between said layers remains as a fluid core heated close to the extrusion temperature at forming; heating said layers to elastically deformable condition by heat derived from said core; and during said shaping tool operation displacing and stretching said layers relative to each other, and further cooling at least one of said layers by contact with a cooled shaping tool surface that corresponds with a desired end product; said fluid core being distributed between said two opposite shell-like outer surfaces in response to shaping pressure.

* * * * *

UNITED STATES PATENT OFFICE
CERTIFICATE OF CORRECTION

Patent No. 4,039,609          Dated August 2, 1977

Inventor(s) Alfons W. Thiel, Mainz; Hans Hell, Wiesbaden

It is certified that error appears in the above-identified patent and that said Letters Patent are hereby corrected as shown below:

Column 4, line 63, change "aritcles" to --articles--.

Column 5, line 16, change "requires" to --required--.

Column 10, line 68, change "moe" to --more--.

Column 11, line 60, change "suface" to --surface--.

Column 17, line 9, insert --from-- between vacuum and bore.

Column 19, line 28, change "pivtos" to --pivots--.

Column 25, line 6, change "arranged" to --arrangement--.

Column 27, line 47, change "gear" to --rear--.

Column 28, line 16, change "341a" to --314a--.

Column 28, line 49, after "drive" add --at--.

Column 30, line 20, change "341" to --314--.

Column 31, line 9, change "(2)" to --(1)--.

Column 32, line 7, claim 8 change "200° 14 220°C" to --200°-220°C--.

UNITED STATES PATENT OFFICE
CERTIFICATE OF CORRECTION

Patent No. 4,039,609  Dated August 2, 1977

Inventor(s) Alfons W. Thiel, Mainz; Hans Hell, Wiesbaden

It is certified that error appears in the above-identified patent and that said Letters Patent are hereby corrected as shown below:

Column 32, line 43, claim 16 change "170°C- °C" to --170°C-180°C--.

Column 33, line 6, claim 23 change "move" to --more--.

Signed and Sealed this

Sixth Day of December 1977

[SEAL]

Attest:

RUTH C. MASON
*Attesting Officer*

LUTRELLE F. PARKER
*Acting Commissioner of Patents and Trademarks*